United States Patent
Korte et al.

(10) Patent No.: US 11,025,972 B2
(45) Date of Patent: Jun. 1, 2021

(54) METHOD AND SYSTEM FOR ANALYZING AUDIO, VIDEO, AND AUDIO-VIDEO MEDIA DATA STREAMS

(71) Applicant: Q'LIGENT CORPORATION, Melbourne, FL (US)

(72) Inventors: Theodore H. Korte, Satellite Beach, FL (US); Alexander V. Galanin, Nizhny Novgorod (RU); Andrey G. Gaynulin, Nizhny Novgorod (RU); Anatoly V. Shishin, Nizhny Novgorod (RU); Andrey E. Turkin, Nizhny Novgorod (RU)

(73) Assignee: QLIGENT CORPORATION, Melbourne, FL (US)

( * ) Notice: Subject to any disclaimer, the term of this patent is extended or adjusted under 35 U.S.C. 154(b) by 2 days.

(21) Appl. No.: 16/378,498

(22) Filed: Apr. 8, 2019

(65) Prior Publication Data

US 2019/0342594 A1    Nov. 7, 2019

Related U.S. Application Data

(60) Provisional application No. 62/654,503, filed on Apr. 8, 2018.

(51) Int. Cl.
*H04N 17/00* (2006.01)
*H04N 21/233* (2011.01)
(Continued)

(52) U.S. Cl.
CPC ....... *H04N 21/2407* (2013.01); *H04N 7/0127* (2013.01); *H04N 7/0135* (2013.01);
(Continued)

(58) Field of Classification Search
CPC ............ H04N 21/2407; H04N 21/233; H04N 21/23418; H04N 21/4394;
(Continued)

(56) References Cited

U.S. PATENT DOCUMENTS

| 4,739,398 A | 4/1988 | Thomas et al. |
| 6,246,803 B1 | 6/2001 | Gauch |

(Continued)

OTHER PUBLICATIONS

SMPTE Standard Audio to Video Synchronization Measurement—Fingerprint Generation, Oct. 9, 2015, pp. 1-23, 2064-1:2015, The Society of Motion Picture and Television Engineers, White Plains, NY.

(Continued)

*Primary Examiner* — Nathan J Flynn
*Assistant Examiner* — Caroline Somera
(74) *Attorney, Agent, or Firm* — Wolter Van Dyke Davis, PLLC; John L. DeAngelis

(57) ABSTRACT

A method and system for comparing video and audio information at first and second spaced-apart locations on a content distribution network. Network probes are located on the network and extract a respective first and second plurality of video frames and audio segments. Two fingerprints sequences are determined from each one of the frames and segments, then the sequences are matched and time-aligned. A beginning of a matched segment is determined and the individual fingerprints within each of the fingerprint sequences are compared from the beginning of the matched segment. Fingerprints that are determined to be different during the comparison process indicate a change in video or audio content between the two probes.

33 Claims, 13 Drawing Sheets

(51) Int. Cl.
  *H04N 21/24* (2011.01)
  *H04N 7/01* (2006.01)
  *H04N 21/647* (2011.01)
  *H04N 21/234* (2011.01)
  *H04N 21/439* (2011.01)

(52) U.S. Cl.
  CPC .......... *H04N 17/00* (2013.01); *H04N 21/233* (2013.01); *H04N 21/23418* (2013.01); *H04N 21/4394* (2013.01); *H04N 21/64761* (2013.01)

(58) Field of Classification Search
  CPC .......... H04N 21/64761; H04N 7/0127; H04N 7/0135; H04N 17/00
  USPC .......................................................... 725/18
  See application file for complete search history.

(56) References Cited

U.S. PATENT DOCUMENTS

| | | | |
|---|---|---|---|
| 8,401,067 B2 | 4/2013 | Kim et al. | |
| 2015/0082366 A1* | 3/2015 | French | H04N 21/238 725/116 |
| 2016/0182224 A1* | 6/2016 | Theis | H04L 9/0643 380/28 |
| 2020/0145706 A1* | 5/2020 | Jeffrey | H04N 21/8547 |

OTHER PUBLICATIONS

J. Haitsma, T. Kalker, A Highly Robust Audio Fingerprinting System, International Conference on Music Information Retrieval, Oct. 13, 2002, pp. 107-115.

C. Zauner, Implementation and Benchmarking of Perceptual Image Hash Functions, Thesis, Jul. 22, 2010, 107 pages.

* cited by examiner

METHOD AND SYSTEM FOR ANALYZING AUDIO, VIDEO, AND AUDIO-VIDEO MEDIA DATA STREAMS

CROSS REFERENCE TO RELATED APPLICATIONS

This patent application claims priority to a provisional patent application filed Apr. 8, 2018 and assigned Application No. 62/654,503, which is incorporated herein in its entirety.

FIELD OF THE INVENTION

The present invention relates to a method and system for analyzing video and audio data streams as the stream propagates along a transport network, determining whether the stream content matches or differs between various locations on the network.

BACKGROUND OF THE INVENTION

Streaming media (audio, video and data) is now digitized, transportation networks provide high speed delivery, and consumers are armed with a variety of smart devices for viewing and listening to the content represented by the media stream. In addition to current media distribution platforms, such as terrestrial, satellite, and cable, the media is distributed over multiple internet-based streaming services. Where there are tens of cable services there are hundreds of streaming services.

As a result, broadcasters, networks, content creators, content providers, advertisers, etc. rely on third parties to deliver their content to end users. In the past, these third parties could control the end-to-end distribution channel. Today, instead of controlling the media from its source to the antenna or to the set top box (STB) or to the internet endpoint, these parties rely on multiple additional third-party entities, such as streaming services, content delivery networks (CDN's), and internet service providers (ISP's) to transmit the media stream to end users. Legacy services (e.g., broadcasters) are also moving to the use of outsourced providers, thus removing end-to-end control of even traditional broadcast services.

As-run software in use today (i.e., software that logs the programming material leaving the studio in route to the end user) cannot determine how the source media content fared as it passed through downstream distribution channels. Increasing functionality in the transmission path dynamically manipulates the data streams, thereby effecting the content after it exits the master control environment and speeds along the path to end users.

With repeated processing of the media stream in today's multiplatform distribution system, it is easy for errors and anomalies to occur in the video and audio streams. For example: it is easy for the video and audio to lose synchronization; affiliate stations can insert local programming at the wrong time in violation of a Service Level Agreement (SLA); paid national or regional advertisements can be replaced with an ad aligned with the interests of the local distributor; the content can be moved to a different time or content duration reduced to free up air time that is available for reselling. Thus, as can be seen, once it leaves the master control environment, the media stream is beyond control of the content source.

Further, content providers never know whether a technical problem detracts from the viewer experience and thereby causes the viewer to abandon the program. Did the viewer simply lose interest or was there a technical problem, e.g., too much time to buffer the signal, frozen video, or audio not synced with video?

Content providers and media sources are interested in identifying and correcting problems and anomalies that occur in the distribution chain, since any such problem may cause viewers to switch to another television channel, or equivalently, switch to a different media stream.

Certain audio and video problems may be caused by failures in the distribution system (e.g., latency, loss of synchronization, and blocky video). Other problems are designated as program or content problems and are typically the result of negligent or purposeful acts of parties who control the distribution chain (e.g., streaming the wrong video, changing the video aspect ratio, failing to insert a bug or a crawler, inserting the wrong bug or crawler).

Therefore, today's media distribution system requires verification of the delivered end-product, that is, as close as possible to the location of the end-consumer or end-user. The issue to be addressed is whether the media data stream received at the end-point, where the viewer/listener experiences the video or audio programming (or as close as possible to the end-point), is identical to the media stream supplied from the source (reference stream) or was legitimately modified only as contractually agreed upon (e.g., an approved local ad insertion). And what, if any, are the differences between the as-delivered and the as-received product.

There are many prior art techniques that compare two video/audio streams or various segments of the two audio/video streams. Some broadcasters have employed paid personal to manually compare the media stream recorded at selected end-points with the reference stream. Because this approach is costly and prone to human errors, attempts have been made to recharacterize the media streams for comparison by a computer.

Another approach embeds visible or invisible watermarks within the video signal. These watermarks can be recognized by a computer and used for comparing streams. The main disadvantage of this approach is that the watermarks may not survive current compression and decompression techniques.

Another approach uses sequences of fingerprints or digital "signatures" to compare two media streams. For example, U.S. Pat. No. 4,739,398 by Thomas. et al., describes a system, method, and apparatus for comparing broadcast segments, which relies on a digital "signatures" hash table of video streams. Each signature is based on an average luminance for randomly selected frames, as well as selected locations within each analyzed frame.

U.S. Pat. No. 6,246,803 by John M. Gauch describes a method and system that uses a plurality of color and central moments calculated for each frame as digital "signatures" for use in comparing two streams.

The SMPTE standard ST 2064-1:2015 defines several methods of generating video and audio digital fingerprints to use for video and audio comparison.

The main limitations of all such prior art methods and systems are:

They usually assume that two compared streams have the same frame rate. But the frame rate can be different depending on the device receiving the stream (i.e., a STB receiving device vs. a mobile phone receiving device). The frame rates can also vary dynamically.

Compensation for different propagation delays of the two streams (referred to as streams alignment) is either not addressed and compensated or a simple search with a frame by frame linear shift is suggested. This technique requires considerable processing power to perform stream alignment in real-time.

These and other limitations discourage widespread acceptance of current stream alignment techniques for commercial applications, such as real-time verification of the media streams received at various end-points in a modern multi-platform distribution system The present invention overcomes the above-mentioned limitations and offers many other benefits.

BRIEF DESCRIPTION OF THE DRAWINGS

The forgoing and other features of the present invention will be apparent to one skilled in the art to which the present invention relates upon consideration of the description of the invention with reference to the accompanying drawings, herein.

DETAILED DESCRIPTION OF THE INVENTION

Figure 1:
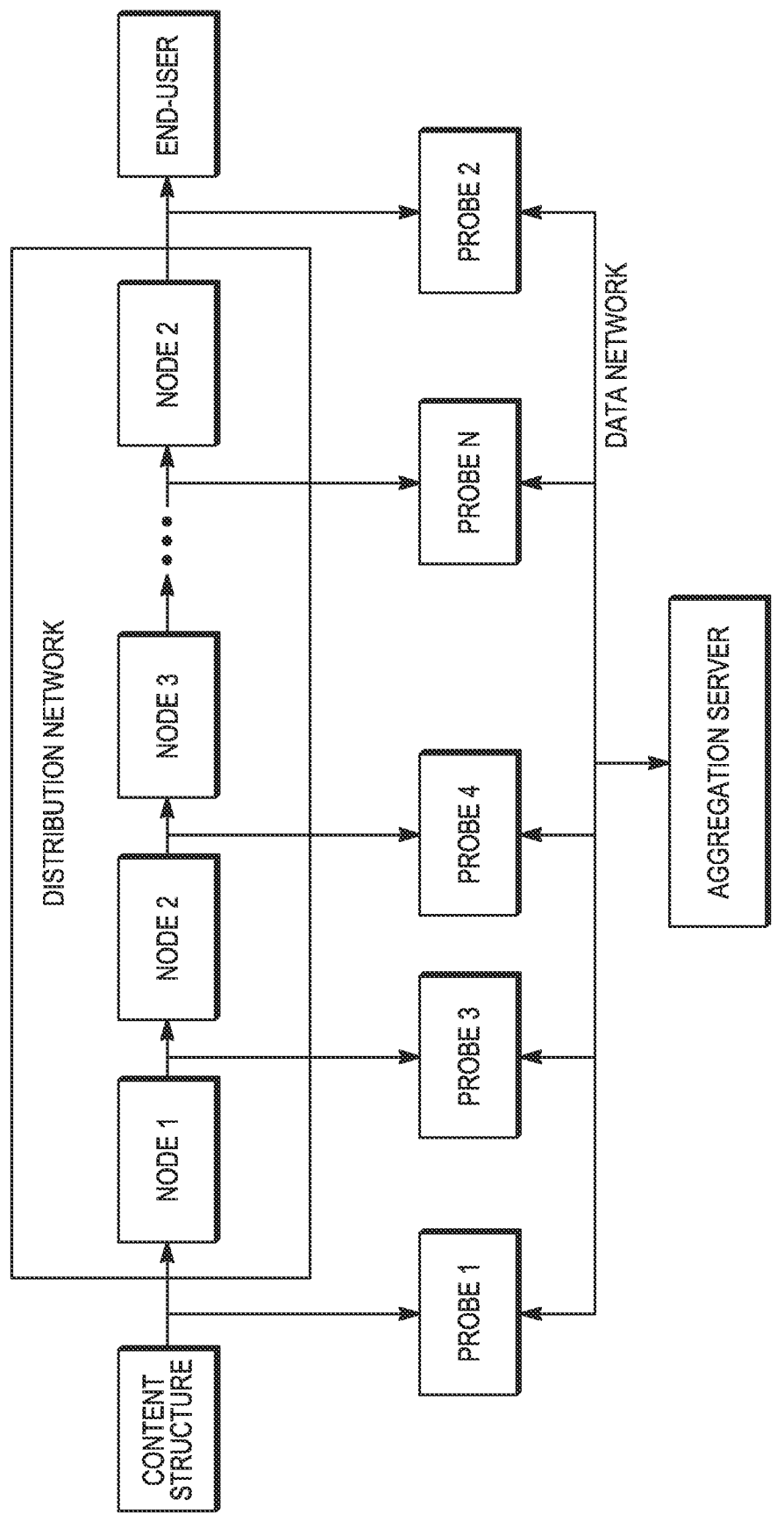
FIG. 1 illustrates a system block diagram.

The present invention comprises a system for analyzing audio, video, and audio-video media data streams at various points in the content distribution network. At least two monitoring probes are installed on the network. Preferably a monitoring probe is installed at the content source and another along the "last mile," i.e., near the end user's location. Additional probes can be installed anywhere on the distribution network between these two probes.

The system compares the media streams at any two probe sites in near real-time and determines whether video, audio, and metadata streams are identical or near-identical (matched) or different at the two probe sites. Preferably, one such probe site is at the content source and another along the "last mile."

A "matched" indicates that the content is unchanged between the two sites. If the sites comprise the content source and the "last mile," then a "match" shows that the source content reached the end-user as intended.

A "different" finding suggests a technical or programming issue between the two monitoring probes. The system reports this "different" finding in near real-time, thereby allowing interested parties (content providers, distributors, and service providers) to correct issues immediately and minimize impacts on the viewer's experience.

Probes can be located at multiple locations along the distribution network to determine the source of the problem, i.e., a video segment between two probes, where one probe indicates a "matched" condition, and the next consecutive downstream probe indicates a "different" condition.

The list below sets forth examples of content verification elements (i.e., verifying that the content complies with broadcast regulations and service level agreements (SLA)), and potential distribution problems (e.g., technical network problems) that the system of the present invention can identify for both video and audio streams (television) and for audio-only streams.

1. Verifying that a stream created by the content provider was delivered as is (unaltered) to the end users.
2. Detecting a logo or other text/logo overlaying an authorized logo, unauthorized ticker line additions, shortening content duration, etc.
3. Detecting stream interruptions (outages) in the distribution network.
4. Comparing signal quality (comparison of bit rate, frame rate, resolution, aspect ratio, etc.) at a distribution source versus signal quality at a delivery point to an end-user, i.e., the "last mile."
5. Determining location in the distribution chain where the stream has been altered or the stream quality degraded.
6. Verifying service content. Was the correct content carried on the correct service as supplied to the end-users?
7. Verifying real-time ad insertion (also referred to as linear ad insertion verification). Is the correct ad been run at the correct time?
8. Verifying city blackouts (for sports programming, i.e., sports programs not broadcast on a local channel under certain conditions).
9. Detecting program time compression (i.e., unauthorized time compression of program content to create air-time for more commercials).
10. Verifying the correct audio track (e.g., is the language of the audio track correct).
11. Verifying the as-run reports. As-run reports identify the programming content and air-time that the automation system is to command for airing. For example, the as-run report tells the automation system to command a video server to air Big Bang Series 2, Episode 4, Segment 1. The report provided by the present invention (which can also be used to reconcile payments) can verify that program (or an ad) was aired at the scheduled time as set forth in the as-run report. Given today's complex distribution chain involving multiple parties, the as-run report requires secondary verification of the programming content that reached the end-user. The present invention thus provides a report of the programming content that reached the "last mile" on its path to the end-user, i.e., did the content at the last mile match the source content.
12. Measuring video latency (delay) introduced by the distribution chain; the delay is reported with a one frame accuracy.

13. Measuring audio latency introduced by the distribution chain; the latency is reported with up to 1 msec accuracy.
14. Detecting video-to-audio delay (LipSync) as experienced by end-users.

System Description

FIG. 1 shows the system architecture as well as simplified media distribution chain for one content source provider and one end-user. The depicted distribution chain comprises a content source, a content transport network, one or several distribution nodes, and an end-user.

The content source represents a facility where an original media stream is prepared (e.g., a master control environment). The content source is typically a content provider's station or a national or regional broadcasting network center. But the content source, as relates to the present invention, comprises any media stream source that, for the purpose of this invention, is considered a reference stream.

The distribution nodes (1-N) comprise the distribution network (i.e., a content distribution network (CDN), the Internet for IPTV, streaming services, Internet service providers (ISPs), etc.). Each node processes the media streams it receives from different content sources (only one content source depicted in FIG. 1). Each node aggregates individual streams into program packets, adds regional or local content, and adds advertisements.

But in today's complex content delivery system there may be many different providers who own and manage the nodes in the distribution network. No single entity is responsible for end-to-end content delivery and thus the entity responsible for content issues cannot be easily identified.

A service provider manages the "last mile" segment of the network and nodes within that segment. The service provider may comprise a TV station broadcasting television signals over the air, a cable provider supplying content via a cable network, a satellite provider, a streaming service, etc. The distribution nodes, including the service providers, comprise the content distribution Cloud.

The end user can be a TV set, a cable set top box (STB), a satellite receiver, a computer, a mobile device, etc.

FIG. 1 depicts one content source supplying content to one distribution network comprising N nodes and one end user receiving content from the network. In reality there are many content sources feeding content to one or more of the N nodes and many end-users connected to the content distribution Cloud through any one of the N nodes. The system can be easily extended to generic case of M content sources and N end-users connected via the content distribution Cloud.

Continuing with FIG. 1, the system of present invention comprises two or more probes and an aggregation server interconnected by means of data network (i.e. Ethernet, Internet etc.). Probe 1 is connected to the output of the content source. Probe 2 is connected to the output of the network near the end-user. Probes 3, 4, . . . , N are connected at outputs of the network nodes. The total number of probes and the location of each depends on the desired number and location of the content monitoring sites.

A remote probe receives the media stream, fingerprints it (i.e., generates fingerprints from the media stream), and sends a sequence of these fingerprints to at least one other probe(s) (a local probe) where the locally generated fingerprints are compared to the remotely generated fingerprints. Thus, any probe can receive a fingerprints sequences from another probe and compare the received fingerprint sequence to fingerprints sequence it generates locally from its received media stream.

The comparison processes result in a report indicating whether the received fingerprints sequence matches the locally-generated fingerprints sequence (no change in the content) and indicating whether the received fingerprints sequence is different from the locally-generated fingerprints sequence (a change in content).

All probes send these reports (i.e., match or different and sent in near real-time) to the aggregation server where multiple analysis processes are executed.

In another embodiment, each probe sends its fingerprint sequences to a separate comparison server (not shown on the FIG. 1), which compares them by pairs or as full M×N matrix and sends the comparison results to the aggregation server.

The aggregation server further analyzes the comparison results and generates alerts based on content changes between probes on the network. Alerts can be viewed using an aggregation server user interface or sent in real time via email or text messages (e.g., SMS) to interested parties.

Alerts include (but are not limited to):
Streams match
Streams are different (a mismatch)
Video is different from the source content
Audio is different from the source content
Metadata is different from the source metadata
Bit rate is different from the source bit rate
Frame rate is different from the source frame rate
Resolution is different from the source resolution
Aspect ratio is different from the source aspect ratio The aggregation server also generates consolidated reports covering a desired time period (e.g., one day, one week, one month, etc.). Reports can be viewed by interested parties using the aggregation server user interface or they can be automatically sent via email.

Additionally, the aggregation server provides a user interface for configuring the probes and the analysis tasks to be performed at each probe.

In an application deploying only two probes, i.e., one probe immediately downstream of the source content and one probe immediately upstream of the end user, the system can verify whether the media stream delivered to the end-user differs from the original media stream issued from the content source. But the system cannot identify where along the distribution network content was altered or, of course, the cause of the content alteration.

If additional probes three thru N are deployed at intermediate distribution nodes, the system can identify a location where the stream alteration or quality degradation occurred, by comparing the streams (i.e., the fingerprints representing the streams) at different locations along the distribution path with a reference media stream. The reference media stream comprises the source media stream or the stream as received at another probe location on the network.

The system of the present invention can be easily scaled to any number of content sources and end-users by simply adding additional probes. In one embodiment, each probe receives only one signal and performs only one comparison, that is, a comparison between its received stream and the stream received at one other probe. Therefore, the probe computing load does not depend on the total number of content sources and the total number of end-users.

Because sending the fingerprints sequence from one probe to another probe consumes thousands of times less bandwidth than sending the actual media stream, adding additional probes to the system will not overload the data network. If a probe needs to send a fingerprints sequence to many probes (for example, probe one sends fingerprints of the original content stream to probes 2, 3, . . . , N) probe one can use a multicast or a broadcast delivery method, instead of unicasting the fingerprint sequences to only one other probe. This technique further reduces the data network load.

The aggregation server receives only the comparison results (matched or different) from all the system probes. A single aggregation server can accommodate and process data from thousands of probes.

Probe Description

Figure 2:
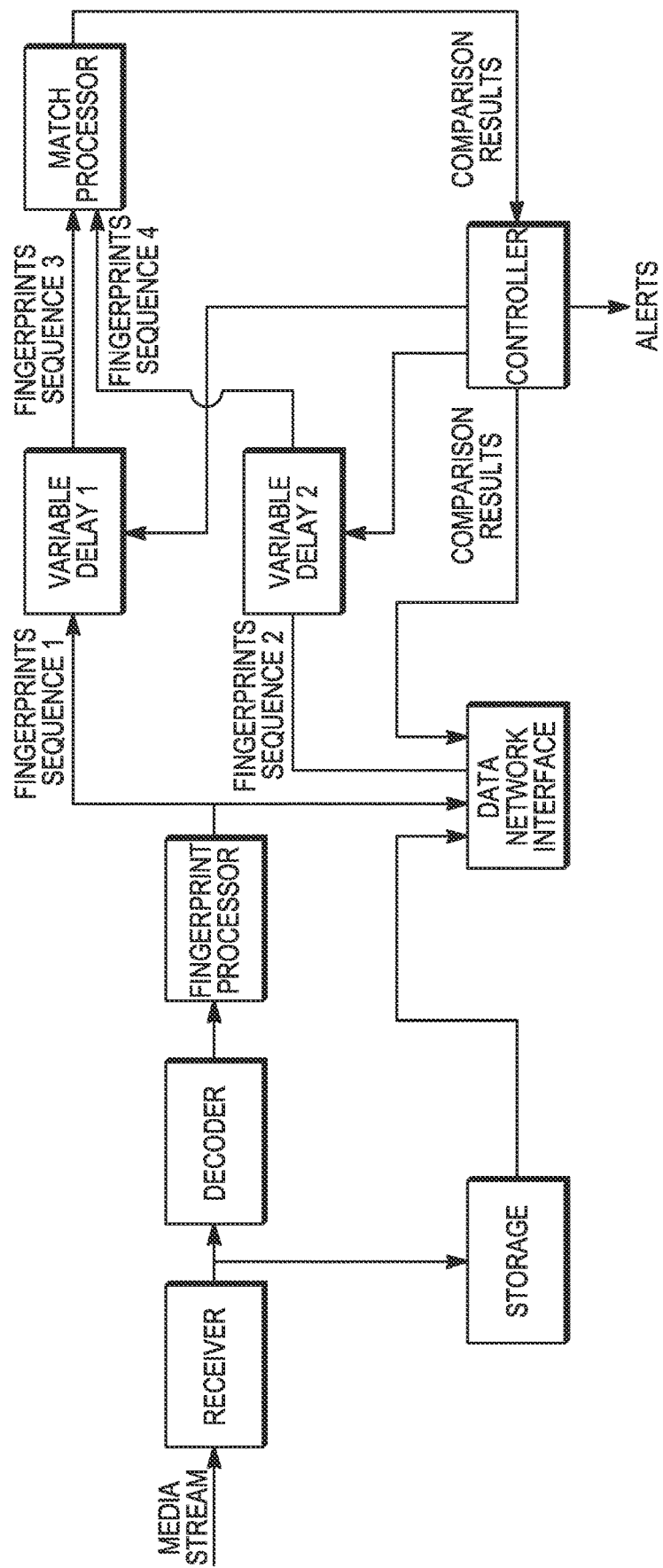
FIG. 2 illustrates a block diagram of a probe.

FIG. 2 illustrates an internal block diagram of a probe. The probe comprises a media stream receiver, a decoder, a fingerprint processor, variable digital delays 1 and 2, a match processor, a controller, a data network interface, and an optional storage element.

The media receiver receives input media stream. Depending on the media stream carrier the receiver could be:
- an RF receiver connected to an antenna for over-the-air TV broadcasts;
- a cable set top box (STB) receiving cable TV channels;
- a satellite TV receiver;
- an Internet interface for IPTV and/or video streaming services (the latter also referred to as OTT streaming media services);
- Any other source of media streams.

The receiver selects a desired channel/frequency/input source and transforms the input stream to a transport stream. As shown in FIG. 2, the transport stream is sent to the decoder and to an optional video storage element.

The optional video storage element stores the input media stream for future viewing. If the system detects a mismatch (different) between the reference media and the end-user media (or generally between any two media streams at any comparison point) later viewing of the recorded streams, for example by the content owner or the service provider, provides evidence of mismatch and/or other problems with the stream.

The decoder decodes the transport stream and sends uncompressed video and audio data to the fingerprint processor.

The fingerprint processor converts the video and audio data into a sequence of video and audio fingerprints. According to one embodiment, one fingerprint is created for each video frame and the frame fingerprint comprises 64 bits. Two fingerprints are created for the audio stream. One audio fingerprint comprises 32 bits and is derived from an audio segment of 625 msec duration and a second audio fingerprint comprises one bit and is derived from an audio segment of one msec duration. Details of the video and audio fingerprints are described below.

Thus, each video fingerprint represents one video frame as a digital value and the two audio fingerprints each represent two different audio segments, each segment represented by a digital value. This fingerprint or "signature" is significantly smaller in size (number of bits) than the original video frame or audio waveform segment. Thus, sending the fingerprints through the digital network requires significantly less (thousands of times less) bandwidth than sending the original video and/or audio data stream.

A properly constructed fingerprint algorithm preserves some unique properties of the video frame and audio waveform segment as the frame or segment was received at the probe. Thus, different video frames and different audio waveform segments generate different fingerprints. In one embodiment, the system is configured to compare the video and audio fingerprints at the source and "last mile," in effect providing a comparison of the source content and the content as viewed by the end-user. Notably, comparison of the fingerprints requires significantly less processing power than comparison of the video and audio source data streams.

The fingerprints processor at each probe also appends a real-time timestamp to each fingerprint, thereby allowing easy retrieval of the source content from storage and measuring the transmission delay of the media stream between two probes.

Continuing with FIG. 2, the fingerprints sequence 1 from the output of the fingerprint processor is input to a variable delay component 1 and also to the data network interface. The data network interface communicates with other probes of the system and with the aggregation server. The type and characteristics of the network data interface depend on details of the data network transporting the fingerprints. For example, for an Ethernet data network data network interface comprises an Ethernet interface.

Fingerprints sequence 2 received from another network probe (a remote fingerprint from a remote probe) via the data network interface is input to a variable delay component 2.

The variable delay components 1 and 2, as controlled by the controller, compensate for different delays incurred by the media streams as they travel from the content source to inputs of their respective probes, and also compensate for delays incurred by the fingerprints sequence 1 and 2 on the path from fingerprint processor that generated the fingerprints sequence, to the inputs of the variable delay components. This process is referred to as "stream alignment" and is further described below. Accurate streams alignment is important for successful and accurate comparison of the media streams and the fingerprints that represent those streams.

There are many ways to implement a variable digital delay. For example, the variable digital delay may comprise a "first in first out" buffer with a variable size that is controlled by a controller. A larger buffer size produces a longer delay in the fingerprints sequence. Note that a delay is required only in the fingerprints sequence path with overall shorter delay from the content source. But because it is unknown in advance which path has a longer delay, the variable delays are included in both paths, with the result that the fingerprints sequences are time-aligned at the outputs of the variable delay components 1 and 2 (the output signals referred to as fingerprint sequences 3 and 4 in FIG. 2).

The fingerprints sequences 3 and 4 are input to a match processor that compares fingerprints sequences and provides results to the controller.

The controller has the following functions:
It executes a streams-alignment algorithm based on the comparison results from the match processor, feeding resulting control signals to the variable delay components 1 and 2 to impose additional delays on each or both of the fingerprints sequences 1 and 2. More specifically, the match processor determines that the two input fingerprints sequence 3 and 4 match or are different. That match or different result is input to the controller, which in turn adjusts the variable delay components 1 and 2 to change the imposed delay on one or both of the fingerprints sequences. This delay adjustment process continues until the streams are aligned, resulting in a "matched" determination from the match processor. Operation of the controller and the match processor is more completely described below.
It sends comparison results to the aggregation server (see FIG. 1) via the data network interface.
It configures the probe's components based on commands from the aggregation server.

Fingerprinting Algorithm for Video

The system calculates or determines video and audio fingerprints as discussed above. According to one embodiment, the video fingerprints are based on well-known perceptual image hashes originally developed for comparing images (Extensive study and benchmarking of the perceptual hashes can be found here: Christoph Zauner. (2010) Implementation and Benchmarking of Perceptual Image Hash Functions. (thesis). https://www.phash.orgidocsipubs/thesis_zaunerpdf)). Unlike cryptographic hashes (MD5 or SHA), which change dramatically with slight changes in the image, the perceptual hashes (aHash, pHash, dHash) can withstand mild transformation of the image, thereby making them suitable for comparing media streams where minor differences are always present in the compared streams (for example different compression noise, slight difference in luminance levels).

A typical video fingerprinting algorithm includes the following steps:
  Input a video frame.
  Remove color information leaving only the luminance information.
  Reduce the image size to 8×8 pixels for the aHash algorithm, to 8×9 pixels for the dHash algorithm, and to 32×32 or 64×64 pixels for the pHash algorithm.
  Calculate the hash value (typically 64 bits). The hash value is the fingerprint.
  Repeat these steps for each subsequent video frame.

Figure 3:
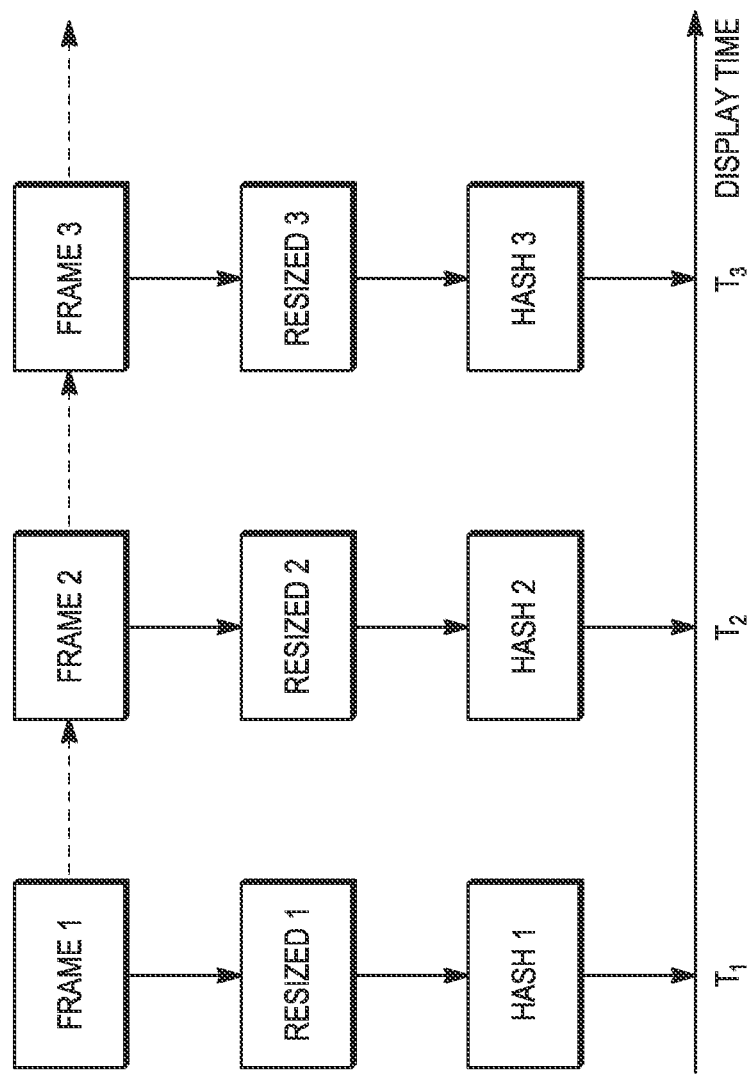
FIG. 3 depicts a prior art system that resizes and hashes video frames.

According to the prior art, fingerprints are calculated for each video frame as shown in prior art FIG. 3. This algorithm works well when comparing two videos with the same frame rate because the fingerprints sequences of the two videos also have the same bitrate.

However, when two video streams have different frame rates, which happens often in a multiplatform content delivery network, the fingerprints created from the two video frames will have different bitrates. Therefore, direct comparison of the fingerprints sequences, without further processing, is not possible.

The fingerprinting algorithm of the present invention overcomes this problem. Instead of fingerprinting the original video frames, it first creates intermediate video frames all with the same fixed frame rate, regardless of the frame rate of the original video. All probes of the system can be configured to use the same fixed frame rate for these intermediate video frames.

Since the frame rates have been modified to the same value, the fingerprints sequences generated by all the probes have the same bitrate, which allows comparison of any two video streams captured by the system regardless of their original frame rates. Preferably, the fixed frame rate should be equal to or greater than the highest frame rate from among all video streams received by all the probes.

The intermediate video frames are created by interpolating between the two closest frames in the original video stream. One (simplest) approach is to use linear pixel-by-pixel interpolation. But other video interpolation algorithms can be also used, as known by those skilled in the art.

Two variants of the video fingerprinting algorithm (which includes the video frame interpolation process) as executed in the fingerprint processor within each probe are described below:
  Variant 1
  Create the intermediate video frame (all with the same frame rate) by interpolating between the two closest original video frames.
  Remove all color information (chrominance) from the intermediate frame, leaving only the luminance information (which reduces the fingerprint size).
  Reduce the image size to 8×8 pixels for the aHash algorithm, to 8×9 pixels for the dHash algorithm, and to 32×32 or 64×64 pixels for the pHash algorithm.
  Calculate the hash value (typically 64 bits) and use it as a fingerprint.
  Repeat these steps for each subsequent video frame.
  Variant 2.
  Remove color information from the original video frame, leaving only the luminance information.
  Reduce the image size to 8×8 pixels for the aHash algorithm, 8×9 pixels for the dHash algorithm, and 32×32 or 64×64 pixels for the pHash algorithm.
  Create a reduced-size intermediate video image using pixel-by-pixel interpolation between the pixels of the two closest reduced-size images Calculate the hash value (typically 64 bits) and use it as a fingerprint for each video frame.
  Repeat these five steps for each subsequent video frame.

The variant 1 interpolation is performed on the original video frames before image size reduction. Thus, the intermediate video frames have the same resolution as the original video frames. The variant 2 interpolation is performed after image size reduction and therefore the intermediate video frames have a reduced size. The variant 1 technique is potentially more accurate. But the variant 2 technique requires significantly less processing power for performing the interpolation operation.

Figure 4:
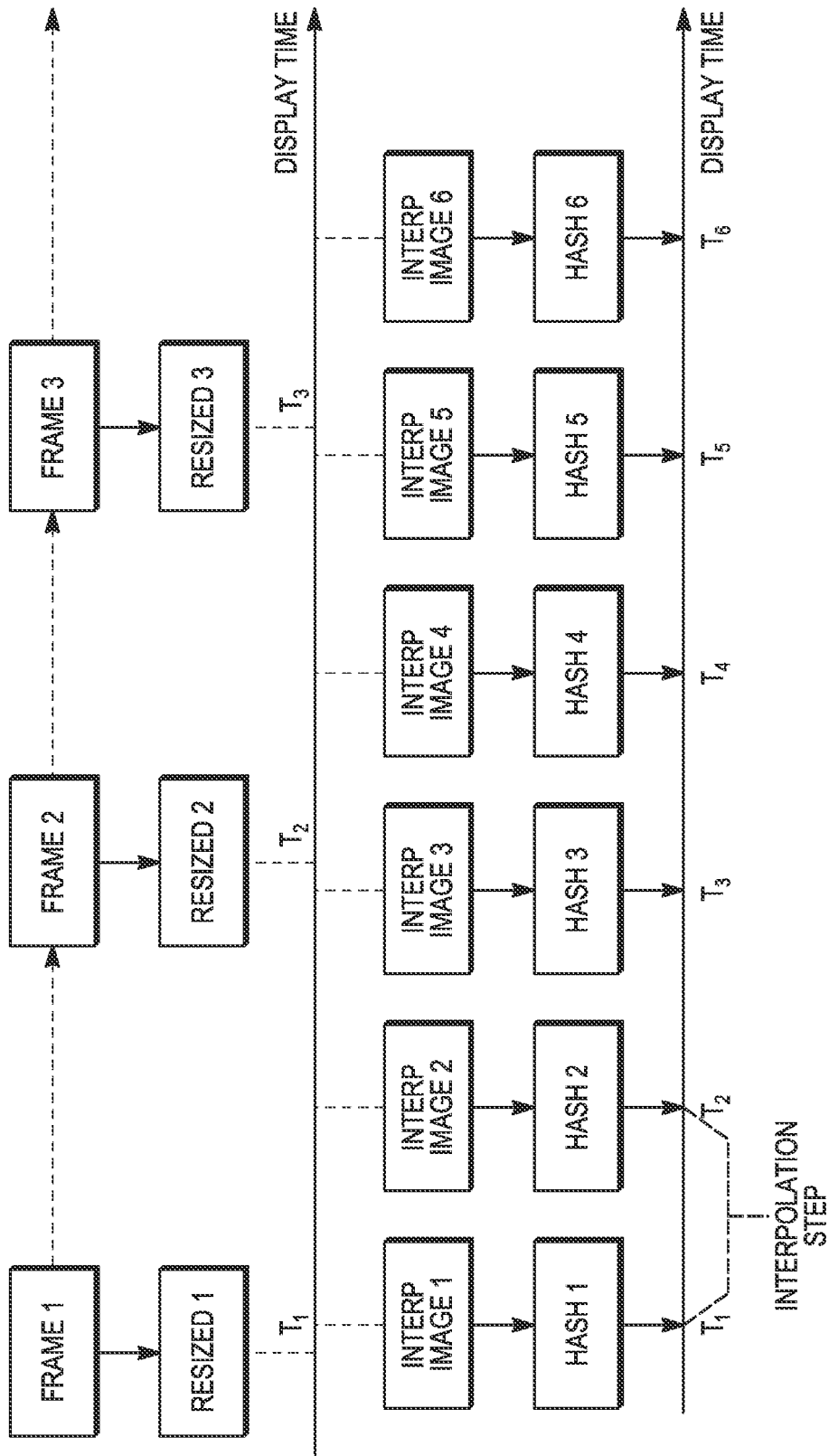
FIG. 4 depicts a system of the invention for resizing, interpolating, and hashing progressive video frames.
Figure 5:
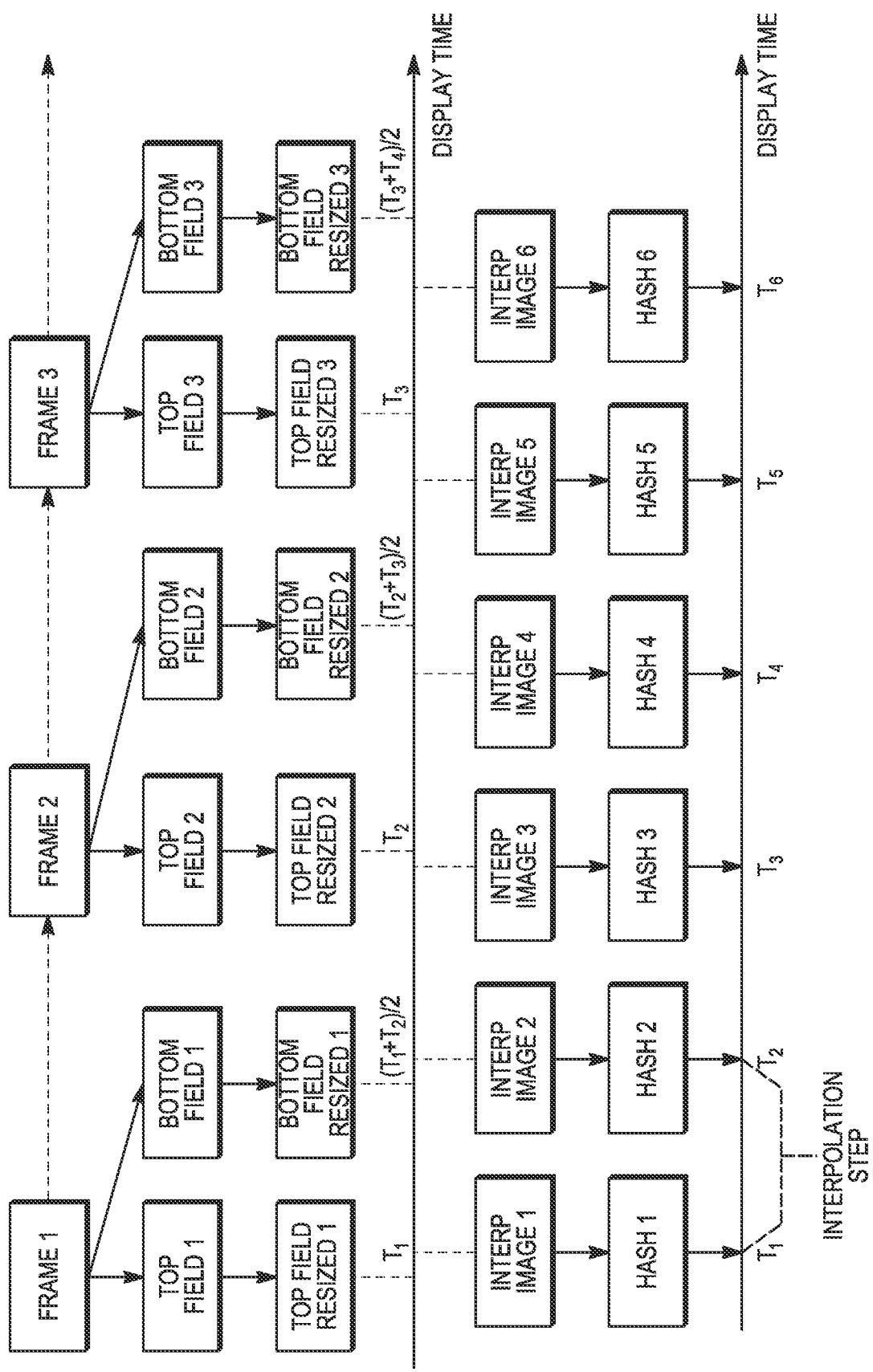
FIG. 5 depicts a system of the invention for resizing, interpolating, and hashing interlaced video frames.

The FIG. 4 illustrates video fingerprinting with the interpolation algorithm (variant 2) for a progressive video image. FIG. 5 below describes the process for interlaced video frames.

Original video frame1, frame2, frame3, . . . have display times $T_1$, $T_2$, $T_3$, . . . $T_M$ respectively.

In a digital video system, each frame has an attribute called "display time". The display time determines time when a frame should be displayed and is necessary because digital frames are delivered to end-users asynchronously. For example, there may be a temporary delay in the distribution network, which can be compensated by delivering several frames at high speed with little delay between them. Unlike analog video, the arrival time of digital frames does not respect the frame rate. The difference between the display time of subsequent frames follows the frame rate rule. In reality, the display time is not an absolute display time due to unknown propagation delays between the content source and the end-user, but the display time is used as a relative scale. The frames are displayed with an interval between them that is equal to the difference between their display times.

Each frame is first resized. The resized frames retain the same display time.

But the display times of interpolated intermediate frames $t_1$, $t_2$, $t_3$, $t_4$, . . . $t_n$ are different and determined by the interpolation step as follows:

$$t_n = t_{n-1} + \text{interpolation step}$$

The interpolation step is defined by following equation $$\text{interpolation step} = \frac{1}{\text{fixed frames rate}}$$

In the case of linear pixel-by-pixel interpolation, the luminance L for each pixel of the intermediate frame with display time to is calculated as follows:

$$L = Y_M + (t_n - T_M) * \frac{Y_{M+1} - Y_M}{T_{M+1} - T_M}$$

where $Y_M$ is pixel luminance of reduced size original frame with display time $T_M$;

$Y_{M+1}$ is pixel luminance of reduced size original frame with display time $T_{M+1}$;

$T_M \leq t_n \leq T_{M+1}$

Other video interpolation algorithms can also be used.

FIG. 5 illustrates video fingerprinting with interpolation algorithm (variant 2) for interlaced video. It includes an additional step of extracting top and bottom fields (i.e., the first and second fields) of a frame from the original frames. The display time of the top field is equal to the frame display time. But the display time of the bottom field is at a mid-point between the display time of the top field and the display time of the next frame.

Both the top and bottom fields are resized as shown. The resized frames comprise a single resized frames sequence for interpolation. Because the resized frame size is so small compared to the resolution of the original fields, the fact that top and bottom fields contain different pixels from the full frame has negligible impact on the resized frame.

With continuing reference to FIG. 5, as in FIG. 4, the top and bottom resized fields are interpolated and hashed.

As described herein, several different hashing algorithms are available for use with the interpolated images. Each perceptual hashing function (aHash, pHash, dHash) has certain advantages and disadvantages. For example, pHash is better than dHash for recognizing changes in small areas of a video frame, such as adding a network logo or a news crawl line. On the other hand, dHash is better for recognizing differences in low-contrast scenes.

The system of the invention allows selection of the perceptual hashing function—aHash, pHash, or dHash—depending on type of video content and primary objective of the system. If the primary objective is the recognition of altered content by adding logos, news crawl line, overlaid advertisement then pHash is preferable. If the main task of the system is to validate that the correct content was delivered at the right time, then dHash is preferable.

According to one embodiment, the resizing and interpolating operations are executed at the probe that extracts the video from the network.

Fingerprinting Algorithm for Audio

For an audio stream, the system calculates two audio fingerprints. An audio fingerprint type 1 is defined in the Society of Motion Picture and Television Engineers (SMPTE) standard ST 2064-1:2015. It has a length of 1 bit, covers 1 msec of audio waveform, and therefore produces 1000 fingerprints per second.

The audio fingerprint type 2 uses the audio pHash algorithm (in a preferred embodiment) initially described in J. Haitsma, T. Kalker, "A Highly Robust Audio Fingerprinting System", International Conference on Music Information Retrieval, pp. 107-115, 2002. This fingerprint is 32 bits in length, covers 625 msec of an audio waveform, and produces 40 fingerprints per second. According to this hashing algorithm the audio waveform segments of consecutive fingerprints overlap.

The audio fingerprint type 1 can be used to detect the beginning of matched audio segments and to measure delays between two audios with 1 msec accuracy. That is, it's resolution in determining the beginnings of two matched segments is 1 msec. But it has high level of false positive detections (i.e., indicating that the fingerprints match when in fact the two audio streams from which the fingerprints are derived do not match) if the delay between two audio signals is greater than about 50 msec.

The audio fingerprint type 2 is very robust in detecting that two audio segments are different even with large delays between them (i.e., has a low level of false positives), but its resolution in determining the beginnings of two matched segments is only 25 msec.

Thus, the present invention uses both audio fingerprints type 1 and 2, thereby combining the robustness of the audio fingerprints type 2 and high accuracy of the audio fingerprints type 1. In one embodiment the invention first uses the audio fingerprints type 2 to perform coarse alignment of two audio streams and then refines alignment down to 1 msec accuracy by using the fingerprints type 1.

Comparison Algorithm for Video Fingerprint Blocks

The match processor compares one fingerprint from the fingerprints sequence 3 with a corresponding fingerprint from fingerprints sequence 4. See FIG. 2. The matching process can be extended to a general case of full M×N matrix comparison. The video and audio fingerprints are compared separately.

A Hamming distance is calculated between the two fingerprints (i.e., one fingerprint generated from the signal as received at the local probe and the other fingerprint from a signal as received at a remote probe). The Hamming distance between two binary vectors of equal length is the number of positions at which the corresponding bits are different. If two fingerprints are identical the Hamming distance is 0. The maximum Hamming distance is equal to the number of bits in each fingerprint.

For example, if the size of each video fingerprint is 64 bits, then the Hamming distance can vary between 0 and 64. If the Hamming distance is greater than a configurable or predetermined threshold then the two fingerprints are declared to be different. If the Hamming distance is less than or equal to the threshold then the two fingerprints are declared to match. The threshold could be determined empirically (e.g., a trial and error process) based on processing training videos.

Figure 6:
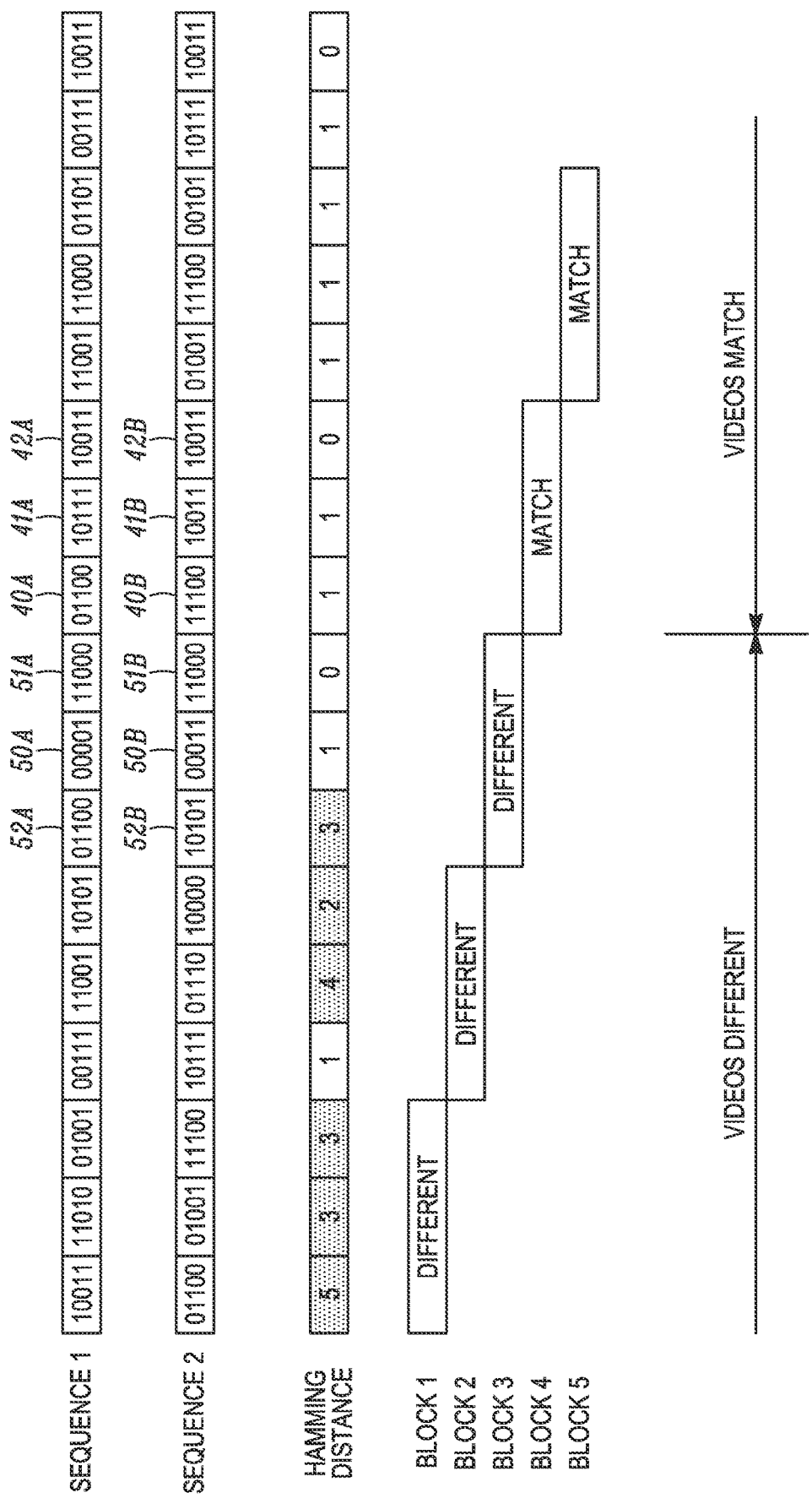
FIG. 6 illustrates matched and different fingerprint blocks derived from video frames.

In the example of FIG. 6, each video fingerprint represents a video frame and comprises a plurality of bits (five bits per fingerprint in this simplified example). In this example, three fingerprints comprise a block, but the block length is variable.

The first three fingerprints of fingerprints sequence 1 are compared with the respective first three fingerprints of sequence 2 and the resulting Hamming distances determined for each frame/fingerprint. See FIG. 6. Comparing the first fingerprint in sequence 1 with the first fingerprint in sequence 2, the Hamming distance is 5. For the second fingerprint in sequences 1 and 2 the Hamming distance is 3. And for the third fingerprint in sequences 1 and 2 the Hamming distance is again 3.

The third line of FIG. 6 sets forth the Hamming distance value for each of the fingerprint comparisons. In the third line, a shaded rectangle (a background pattern within the rectangle) indicates Hamming distances greater than the threshold and a clear rectangle indicates a Hamming distance value equal to or less than the threshold. For this example, the Hamming distance threshold is 1.

With continued reference to FIG. 6, the line labeled "Block1" indicates the results of the comparisons of the first three fingerprints in sequences 1 and 2. In this example, a block (of three fingerprints) is declared "different" if 1, 2, or 3 of the Hamming distance values within that block are greater than the threshold. Since the three Hamming distance values in block 1 are all greater than the threshold of 1, block 1 is considered "different."

Two of the three Hamming distance values in block 2 are greater than the threshold and therefore block 2 is declared "different."

One of the three Hamming distance values in block 3 is greater than the threshold and therefore block 3 is declared "different."

Note that this rule for declaring a block "different" applies only to this example. In general, a block of fingerprints is considered "matched" when all the Hamming distance values are less than a predetermined threshold.

In blocks 4 and 5 all the Hamming distance values are equal to or less than the threshold (of 1) and therefore blocks 4 and 5 are declared "matched."

Recall that one objective of the present invention is to determine whether the same video frame received at two spaced-apart network probes is the same/matched at both probes or different at the two probes. Audio segments are also analyzed to determine a "matched" or "different" result. If the two video or audio fingerprints are different then the corresponding video frames or audio segments are different. As discussed, typically this difference is due to a network technical problem or due to the improper addition or deletion of video or audio content as occurred between the two spaced-apart probes.

To reduce the probability of false positives, the fingerprints (and the corresponding Hamming distances) are evaluated in blocks, such as the blocks of FIG. 6. That is, the individual fingerprints from two fingerprints sequences are compared and the Hamming distance calculated for each comparison operation. The fingerprints and the Hamming distance values are then considered in blocks and each block pair (one block based on fingerprints from sequence 1 and the second block based on fingerprints from sequence 2) is declared "matched" or "different." These operations are carried out in the match processor of FIG. 2.

Figure 10:
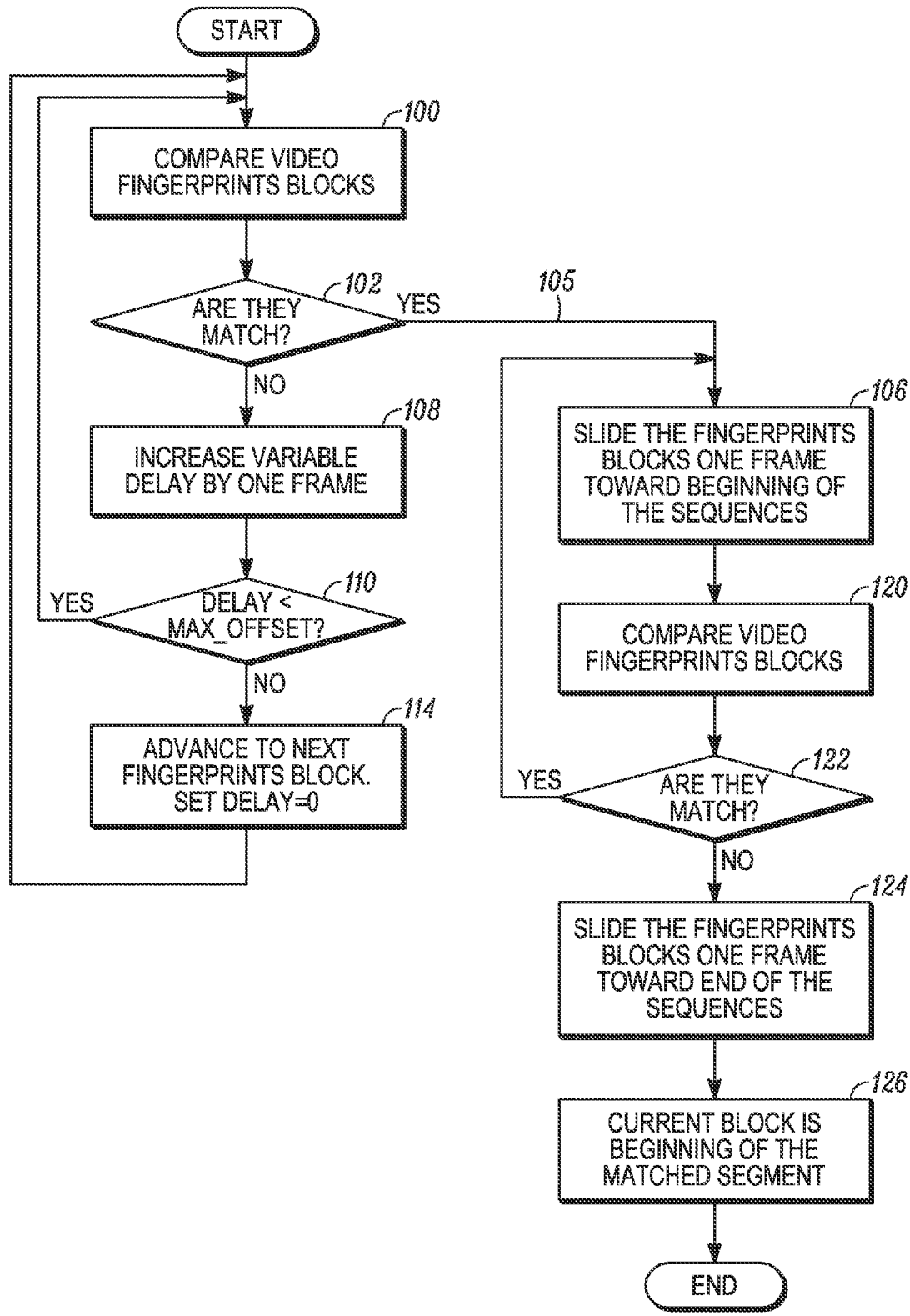
FIG. 10 illustrates a flowchart of a process for aligning two video streams and determining a beginning of matched video intervals within the streams.

But to correctly compare fingerprint blocks, the system must determine that the fingerprints in the two blocks represent the same video frames (or audio segments) and the fingerprint sequences must be time-aligned, i.e., a fingerprint block representing video frames received at one of the probes must be compared to a fingerprint block representing the same video frames as received at another probe. This process is described below in conjunction with FIG. 10 for video frames and FIG. 11 for audio segments.

The present invention also uniquely determines a beginning of a matched fingerprint segment (video or audio) that may begin within a block. With reference again to FIG. 6, it can be seen that longer block lengths result in less accurate detection of the beginning of matched video segments. For example, with reference to block 3, the first Hamming distance in that block is 3, but the second and third Hamming values are 1 and 0, indicating that the second and third fingerprints in block 3 match and thus could be declared as the beginning of a matched video segment.

On the other hand, small block lengths may cause incorrect detection of matched videos (i.e., a false positive) if the blocks represent a short period of similar looking frames in two videos, such as a short black screen transition between two scenes.

The present invention introduces a search algorithm that achieves frame-level accurate detection of the beginning of matched video segments, but keeps the probability of false "match" detections low by using long blocks of fingerprints. The search algorithm is described below in conjunction with FIG. 10 for video blocks and FIG. 11 for audio segments.

Comparison Algorithm for Audio Fingerprint Blocks

For the audio segments, the individual audio fingerprints are compared using the Hamming distance in a similar fashion to comparing the video segments. However, comparing two audio fingerprints sequences is based on bit error rate (BER) that is averaged over a predetermined time interval T, referred to as an analysis interval. As before, the Hamming distance is essentially the number of different bits between two fingerprints. In other words, it is the number of bit errors during the time interval that is covered by one audio fingerprint. The BER for a time period T is calculated as follows:

$$BER = \frac{\sum_{i=1}^{N} H_i}{N * M}$$

where

N—number of fingerprints in interval T

M—number of bits in one fingerprint;

$H_i$—Hamming distance between fingerprint pairs i.

Low accuracy in determining the beginning and end of a matched audio segment is one drawback of a prior art technique that uses this formula. Because the BER is averaged over the interval T (typically 3 to 5 seconds long) and assuming a threshold of 0.35, the interval may be declared "matched" when in fact the matched portion is only 65% of this interval. T Therefore, even using a sliding interval with small time shifts for searching for the beginning of a matched audio segment, the error in determining when the matched portion of the audio sequences begins could be as large as 0.35*T.

Figure 7:
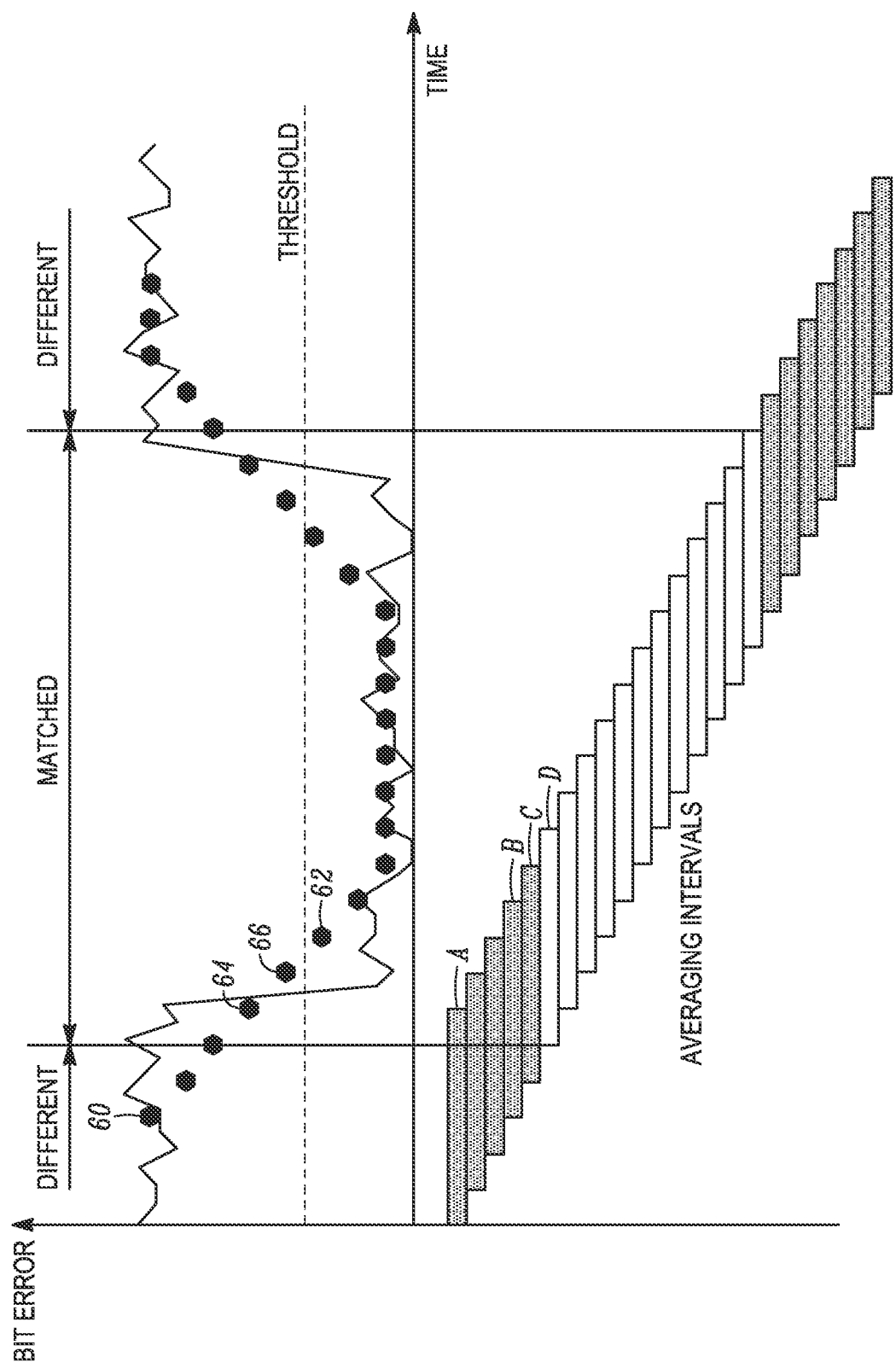
FIG. 7 illustrates a prior art technique for determining matched audio over averaging intervals.

Prior art FIG. 7 illustrates this problem, showing the bit error rate (y-axis) of each fingerprint (the solid line) and the calculated average bit error rate over each averaging interval (black circles) as functions of time (x-axis). Each average BER circle is placed at the center of the corresponding averaging interval. Circle 60 indicates the average BER for averaging interval A, circle 64 indicates the average BER for averaging interval B, and circle 66 indicates the average BER for averaging interval C. There are no circles to the left of the circle 60 as the circle 60 is placed at the center of the averaging interval A, the first averaging interval.

As can be seen, there is a period in the middle of the graph where the average BER over several successive averaging intervals is below the BER threshold.

With reference to the rectangles below the graph, averaging intervals with an average bit error rate above the threshold are depicted with a pattern-filled rectangle and averaging intervals with clear rectangles indicate an average bit error rate below the threshold.

During averaging interval B the average BER is indicated by the circle 64, which is above the threshold and therefore the interval is considered "different." During averaging interval C, a circle 66 indicates the average BER and the interval is considered "different." During averaging interval D the circle 62 indicates the average BER. The circle 62 is below the threshold and the interval D is considered "matched."

As can be seen from prior art FIG. 7, to drive the BER below the threshold of 0.35 and declare the averaging interval "matched," approximately 65% of the comparisons must have a BER below the threshold of 0.35.

Reducing a length of the averaging interval of FIG. 7 reduces errors but increases the rate of false positives and makes the algorithm less robust against additive noise.

The present invention introduces a new method of comparing audio fingerprints sequences, which is referred to as a "Segmented BER" approach. The analysis interval T is split into M segments and the average bit error rate (BER) is calculated for each segment, using the BER equation set forth above.

If the bit error rate of a segment is below the threshold then this segment is considered "matched." The entire analysis interval T is considered "matched" if more than N % of the segments are "matched". The value N is user configurable and can be determined empirically based on the processing of training audio segments. It has been empirically determined that a value of N=90% usually provides good results.

Figure 8:
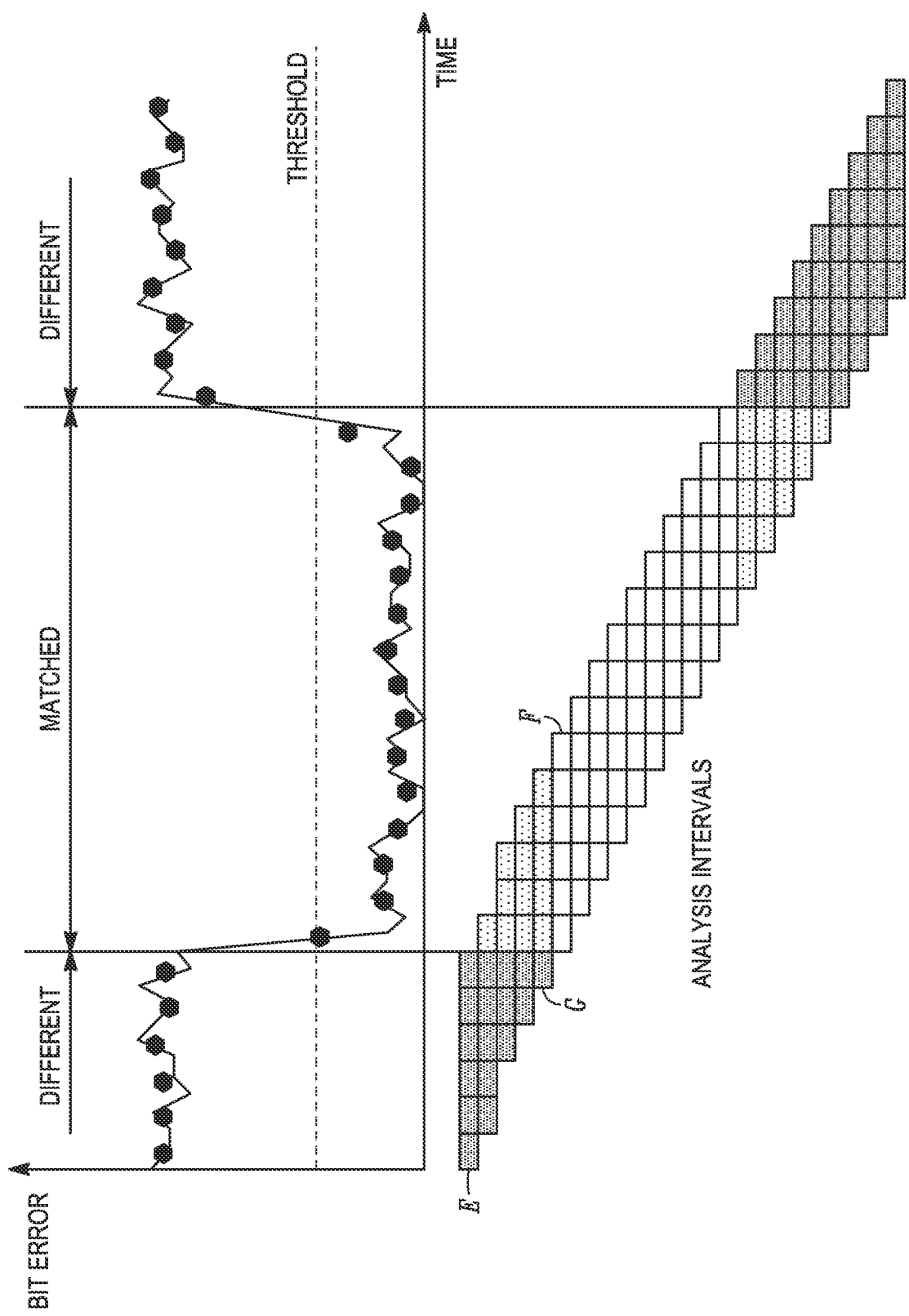
FIGS. 8 and 9 illustrate techniques for determining matched audio intervals according to the teachings of the present invention.

This method is illustrated in FIG. 8, with the BER depicted on the y-axis and time depicted on the x-axis. For the purpose of illustration only, each analysis interval T includes six segments. The large circles represent the average bit error rate for each segment. (Note that in the prior art FIG. 7, the average bit error rate was calculated for each averaging interval.)

The smaller rectangles in the lower portion of FIG. 8 illustrate the results of comparing the average BER for each analysis interval (six segments) with the threshold. The smaller solid rectangles indicate that the segment has a BER above the threshold. See an analysis interval E where all six segments have a BER above the threshold and the analysis interval is considered different.

For analysis intervals during which the average BER for all six segments is below the threshold the smaller rectangular blocks for the six segments are clear. See analysis interval F, which is considered a "matched" analysis interval.

A first segment of an analysis interval G is "solid" as the BER for that segment is above the threshold. The BER is below the threshold for the remaining segments in the analysis interval, and the smaller rectangular blocks for those segments are "grayed." The analysis G interval is considered "different" regardless of BER value of "grayed" segments.

Thus, in one embodiment, for an analysis interval to be considered "matched" all its segments should be "clear" (a BER below the threshold).

For an embodiment using the 90% value, 90% of six segments equals 5.4 segments. Thus, if only one segment is "not-matched" or "different," the 90% threshold has not been reached, rendering the entire analysis interval T as "different." For example, the analysis interval G in FIG. 8 shows one "different" segment and thus the interval G is considered "different."

Accuracy of the detection of the beginning and the end of matched segments is equivalent to the accuracy of traditional BER techniques with an averaging interval of T/M. At the same time the inventive "segmented BER" method does not increase the rate of false positives because the analysis interval for determining whether the two audios match remains at T.

Figure 9:
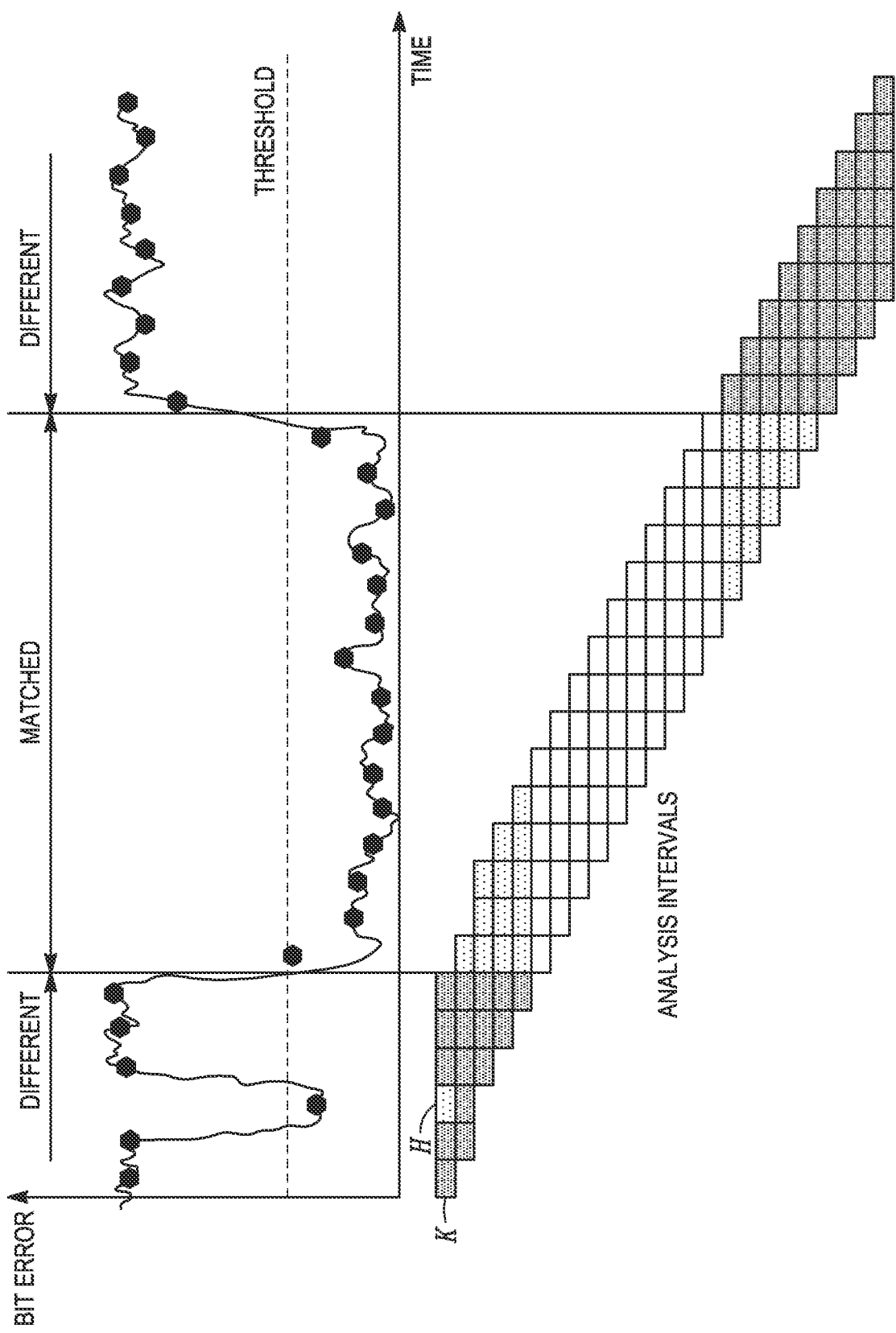

FIG. 9 shows that a short drop in the bit error rate at a segment H of an analysis interval K, which thereby declares segment H of the analysis interval "matched," but does not change the final decision for the analysis interval K. Like the interval G in FIG. 8, the analysis interval H in FIG. 9 is considered "different."

Match Search Algorithm for Time-Aligning Video Fingerprint Sequences and Determining a Beginning of a Matched Video Fingerprint Segment As described above, before initiating the process of declaring a block of video frames (as represented by video fingerprints) and audio segments to be "matched" or "different," (as those frames and segments are received at two different locations along the transport network) the fingerprints representing those frames and segments must be time-aligned and it must also be determined that the fingerprints represent the same video frame (or audio segment) as received at the two probe locations.

In one embodiment, the present invention uses blocks of fingerprints in the time-alignment process. Using blocks instead of individual fingerprints reduces the probability of false positives. For example, individual fingerprints could match "accidentally" (for example, when both represent dark frames in a movie or even from two different movies). Because of the significantly lower probability of accidently matching two blocks of fingerprints, blocks are used in the time-alignment process.

Initial time alignment of the two fingerprints sequences uses the fingerprint timestamp added by the fingerprinting algorithm as described above to provide an initial coarse alignment. With reference to FIG. 2, the controller sets the variable delays 1 and/or 2 to align the two fingerprint sequences such that the fingerprints with the same timestamp appear concurrently at the two inputs of the match processor.

The controller then iteratively increases or decreases the variable delays 1 and/or 2 to align the two fingerprint sequences such that the fingerprints representing the same video frames appear concurrently at the two inputs of the match processor. This additional alignment step will be required due to propagation delays in the media distribution network between the two points where the two media streams were fingerprinted and timestamped.

For example, assume the fingerprints sequence 2 is downstream from the fingerprints sequence 1. The fingerprints sequence 1 will require an additional delay for proper alignment with the fingerprints sequence 2.

Usually the downstream point is easy to identify based on the topology of the distribution path. If this is not possible, then the match search algorithm is executed twice. For the first execution, the algorithm adds additional delay to the variable delay 1. If a match is not found then the second execution adds additional delay to the variable delay 2. The process continues until the two fingerprint sequences are time-aligned. Details of the match search algorithm for video frames is described below in conjunction with FIG. 10.

For simplicity, this algorithm description assumes that initially two videos are not time-aligned (the most common case). The reference characters in the below description refer to FIG. 10.

1. At a step 100, compare two video fingerprint blocks, the fingerprints in each block having been created at two spaced-apart network probes. A decision step 102 asks whether the blocks match, i.e., if the criteria for declaring a match based on the Hamming distance values for the block have been satisfied. If the blocks match, proceed along a path 105 to a step 106. Otherwise continue to a step 108.

2. The step 108 increases the variable delay in the path of one of the video streams by one video frame (i.e., one fingerprint). This action shifts one of the fingerprint sequences relative to the other. A decision step 110 determines whether the variable delay added at the step 108 is greater than a Max_Offset value. The Max_Offset value limits the amount of time shifting (i.e., the number of passes through the step 108 with each pass increasing the variable delay) that is permitted in an effort to align the two fingerprint sequences and is typically an estimated maximum propagation delay between two probes. The alignment algorithm needs to search for perfect alignment only within the range of this additional delay. Note that the probability of matching two blocks of fingerprints from different videos is extremely low if the block length is properly selected. The Max_Offset value recognizes that two blocks of fingerprints may never match regardless of the variable delay imposed. There are two reasons for this possible outcome: the two fingerprint sequences represent different videos or the two fingerprint sequences are not time-aligned. Also note that the concept of time alignment is nonsensical for two different videos. Time alignment makes sense only if two fingerprint sequences represent the same video frames. Of course, at the beginning of the match searching process the algorithm must consider both possible reasons for declaring the two blocks "different." Initially the algorithm tries to time align, with the expectation that the two sequences are form the same video, processing through steps 100, 102, 108, and 110. But after reaching the Max_Offset delay value with no match found, the process quits (inferentially declaring that the two blocks are from different videos). At a step 114, the algorithm moves to the next blocks and begins the block matching process again, returning to the step 100. Typically, the two loops (one loop comprising the steps 100, 102, 108, 110, and the second loop including the step 114) will execute many times before both conditions are satisfied: the two videos are now the same (e.g., after different commercials in the two video streams have ended and the same movie now appears at both probes) and the imposed delay aligns the two fingerprint sequences. At this lucky moment the match between blocks has been found and the answer at the decision step 102 is affirmative. As the two fingerprint sequences are now matched and time aligned, the algorithm begins to search for the actual beginning of the matched segment in two videos. This process begins at the step 106 and is described below.
3. As described above, arriving at the step 114 indicates that the system has been unsuccessful in matching the two fingerprint blocks, despite having shifted one of the fingerprint sequences by the maximum amount permitted by the Max_Offset value. Therefore, at the step 114, the process advances to the next fingerprints blocks, resets the variable delay to 0, and returns to the step 100. The process now begins anew with two new fingerprint blocks.
4. At the step 106 (the "yes" path 105 from the decision step 102) the blocks match (i.e., see FIG. 6, fingerprints 40A/40B, 41A/41B, and 42A/42B match, but the current earliest matching fingerprints (fingerprints 40A/40B from FIG. 6) may not represent the beginning of a matched segment of fingerprints. In fact, in the FIG. 6 example, the fingerprints 40A/40B do not represent the beginning of a matched segment as the immediately prior fingerprints 51A/51B (as well as the fingerprints 50A/50B) also match. Thus, to determine whether any immediately prior matched fingerprints exist, at the step 106 the blocks are each slid one fingerprint (one frame) toward the beginning of the sequences, i.e., to the left in FIG. 6.
5. At a step 120 the process compares the two fingerprints blocks followed by a decision step 122. At this point the two compared blocks now comprise fingerprints 51A/51B, 40A/40B, and 41A/41B and they match so processing returns to the step 106. Otherwise continue to the step 124.
6. Returning to the step 106, the blocks (i.e., both blocks) are again shifted one fingerprint left. Now the blocks comprise fingerprints 50A/50B, 51A/51B, and 40A/40B. The blocks are compared at the step 120 and the decision from the decision step 122 is again affirmative.
7. Processing returns again to the step 106 where the blocks are again shifted one fingerprint left. Now the blocks comprise fingerprints 52A/52B, 50A/50B, and 51A/51B. The blocks are compared at the step 120 and the decision from the decision step 122 is now negative.
8. The position of the previous blocks had been aligned with the beginning of the matched segment, i.e., when the blocks comprised fingerprints 50A/50B, 51A/51B, and 40A/40B. But since the blocks now comprise fingerprints 52A/20B, 50A/50B, and 51A/51B and they did not match, the last slide to the left must now be reversed, i.e., slide the blocks one frame to the right in FIG. 6. See a step 124. The fingerprints blocks are now again aligned with the beginning of the matched segment, i.e., 50A/50B, 51A/51B, and 40A/40B. The beginning of the current blocks is the beginning of the matched segment, as indicated at a step 126. An alert can be issued at this point indicating that a beginning of a matched segment of video frames has been identified.

By adding the path 105 and its process steps, the algorithm of the invention improves the detection accuracy of the beginning of the matched segment. In the prior art, the algorithms constrained the search for the beginning of a matched segment to the block length.

The accuracy in determining the beginning of a matched segment according to the present invention can be as small as one video frame. But in the prior art (i.e., lacking the path 105) the accuracy in determining the beginning of a matched segment is limited to approximately one-half of the block length. As described herein, the block length (typically 10-20 seconds) is important to maintain a low rate of false positive matches; using a shorter block length increases the rate of false positives. In one embodiment, the present invention uses the same block length as the prior art comparison algorithms, but can determine the beginning of a matched segment to an accuracy of one video frame.

Match Search Algorithm for Time-Aligning Audio Fingerprint Sequences and Determining a Beginning of a Matched Audio Fingerprint Segments.

Figure 11:
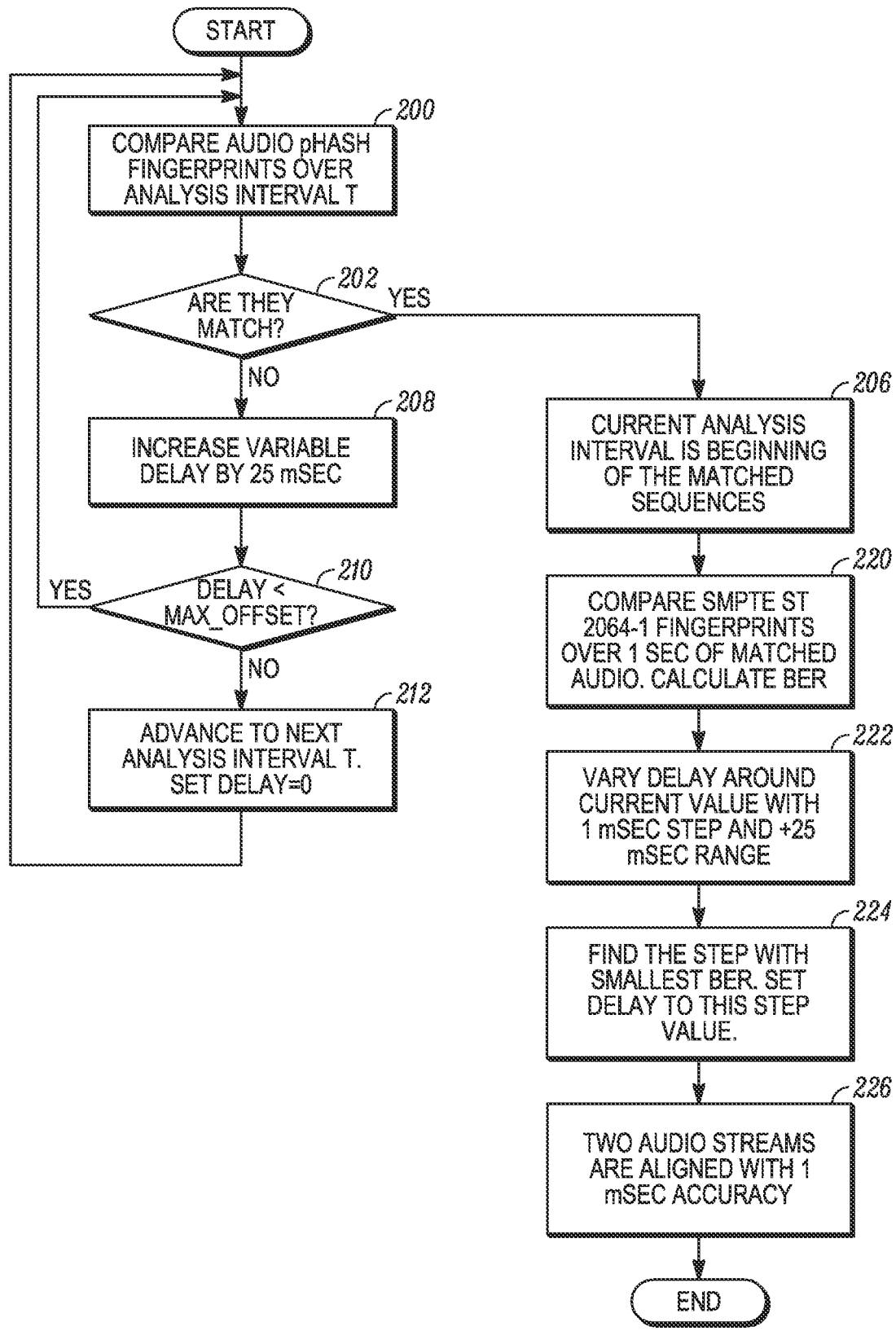
FIG. 11 illustrates a flowchart of a process for aligning two audio streams and determining a beginning of matched audio intervals within the streams.

The algorithm for audio match search is shown on the FIG. 11 and described below. For simplicity, the algorithm description assumes that the two audio segments are not initially aligned (the most common case).

1. The flowchart begins at a step 200 where two audio pHash fingerprints (Type 2 fingerprints as described above) are compared using the "Segmented BER" method over an analysis interval T. If at a decision step 202 the fingerprints match, then two sequences are aligned and fingerprints in this interval T match. The affirmative branch continues to a step 206. If the outcome from the decision step 202 is negative, the process continues to a step 208.

2. Following the "No" branch from the decision step 202, at the step 208 the variable delay is increased by 25 msec, which is the time difference between two consecutive pHash fingerprints.

3. A decision step 210 determines if the variable delay is smaller than Max_Offset. An affirmative answer returns the process to the step 200 where the two fingerprints are again compared. Otherwise the process continues to a step 212. Use of the Max_Offset parameter here is identical to use of the Max_Offset parameter in the FIG. 10 flowchart. In one embodiment the Max_Offset value is about 2 seconds. The value s dependent on the number of distribution nodes between the two probe locations. In some embodiments the value may be as longs as 5 seconds or as short as 0.5 seconds. The Max_Offset value is user configurable. The Max_Offset value in the FIG. 10 video-related algorithm is in the same range.

4. As in the case of the comparison of the video fingerprints, a negative result from the decision step 210 indicates that the fingerprints in this interval do not match after the maximum number of variable delays has been added. Therefore, the process advances to the next fingerprints analysis interval, the variable delay is reset to 0, and the process returns to the step 200 for evaluation of the next analysis interval T.

5. If the decision step 202 determines a match, it is assumed that at a step 206 the current analysis interval is the beginning of two matched fingerprint sequences. But the alignment error between the two sequences may be as great as 25 msec, which is a limitation imposed by the typical parameters of the pHash algorithm. In the next several steps the process is switched to the Type 1 audio fingerprint. But at this point in the process it has been determined that the two audio fingerprint sequences are from the same audio stream with a maximum misalignment of about 25 msec. The next several steps improve the alignment process by reducing that misalignment error.

At a step 220, compare, over a one second interval, SMPTE ST 2064-1:2015 fingerprints (fingerprints Type 1) of the two audio segments that were identified as "matched" at the decision step 202. Calculate the bit error rate BER. In one embodiment the 1 second interval is positioned in the middle of the analysis interval that was identified as matched at the step 202. Using the middle of the interval guarantees that two audio segments matched inside this 1 second interval. Note that two audios may not match at the edges of the analysis interval even if the interval was declared "matched" because of the rule that N % of all segments in the analysis interval must match to consider the interval "matched". One or two edge segments may be "different" depending on total number of segments in the analysis interval and the actual value of N that is used.

6. At a step 222, vary the variable delay around the current delay value by 1 msec steps within ±25 msec range. This process effectively slides the two fingerprints sequences relative to each other. Calculate the BER for each slide step.

7. At a step 224 identify the delay value that yielded the lowest BER and set the variable delay to this value.

8. As indicated at a step 226, the two audio fingerprints sequences are now aligned with 1 msec accuracy. An alignment can be issued at this point in the process.

The inventive algorithm combines the benefits of both types of audio fingerprints: low false positives rate of the pHash fingerprint and 1 msec accuracy of SMPTE ST 2064-1:2015 fingerprint. Alignment accuracy of the audio fingerprints (and the audio streams from which they are derived) determines the accuracy of measuring audio-to-audio delays on the transport network.

Algorithm for Determining the End of Matched Video Frames

Figure 12:
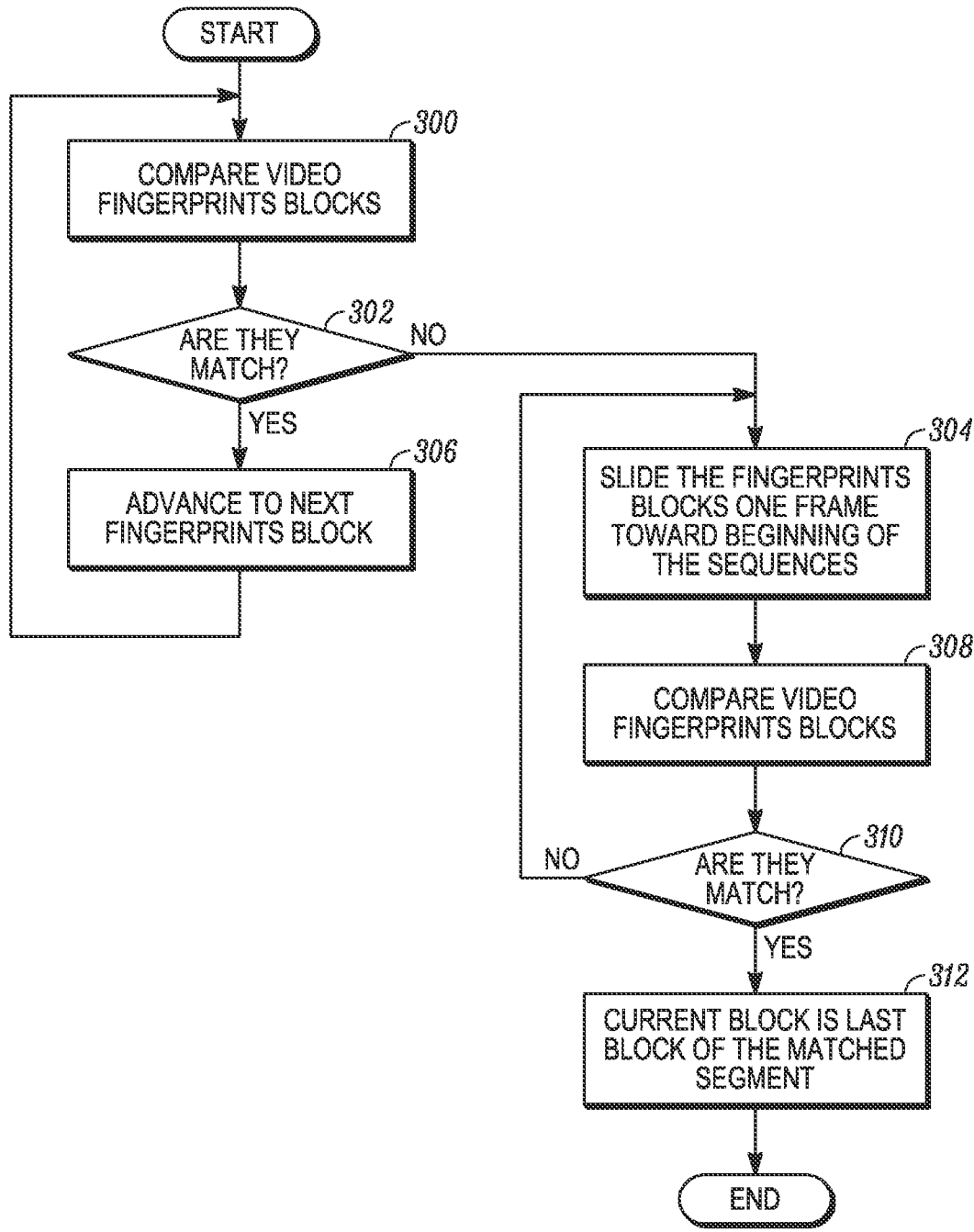
FIG. 12 illustrates a flowchart of a process for determining an end of matched video intervals.

After the beginning of a matched segment is found the system freezes alignment between the two input video fingerprint sequences and starts searching for an end of the matched segment. For video frames, the algorithm is as follows (see FIG. 12).

1. At a step 300 compare two video fingerprints blocks.

2. If a decision step 302 determines that the blocks do not match proceed to a step 304. Otherwise continue to a step 306.

3. At the step 306 advance to the next block and return to the step 300 for comparing the two blocks and determining if they match (at the decision step 302).

4. If the blocks are determined "different" at the decision step 302, the end of the matched segment is inside the current blocks. At the step 304, slide each block one fingerprint (one frame) toward the beginning of the sequences 1 and 2, i.e., to the left in FIG. 6.

5. Compare two fingerprints blocks at a step 308.

6. Determine whether the fingerprint blocks match at a decision step 310. If the fingerprints blocks do not match, return to the step 304 and slide each block to the left again. If the blocks match, continue to a step 312.

7. The step 312 indicates that the current blocks represent the last matched blocks in the video fingerprints segment and thus they are considered the end of the matched segment. As described herein, an alert can be issued at this point, the alert indicating that while the video streams are aligned (that is, the two streams represent the same video frames at two corresponding points on the content distribution network) they do not match, the mismatch due to a technical or programming problem or issue that developed between the two probe locations. The alert issued following the step 312 can be in lieu of or in addition to the alert issued following the step 126, as described above.

Algorithm for Determining the End of Matched Audio Segments

Figure 13:
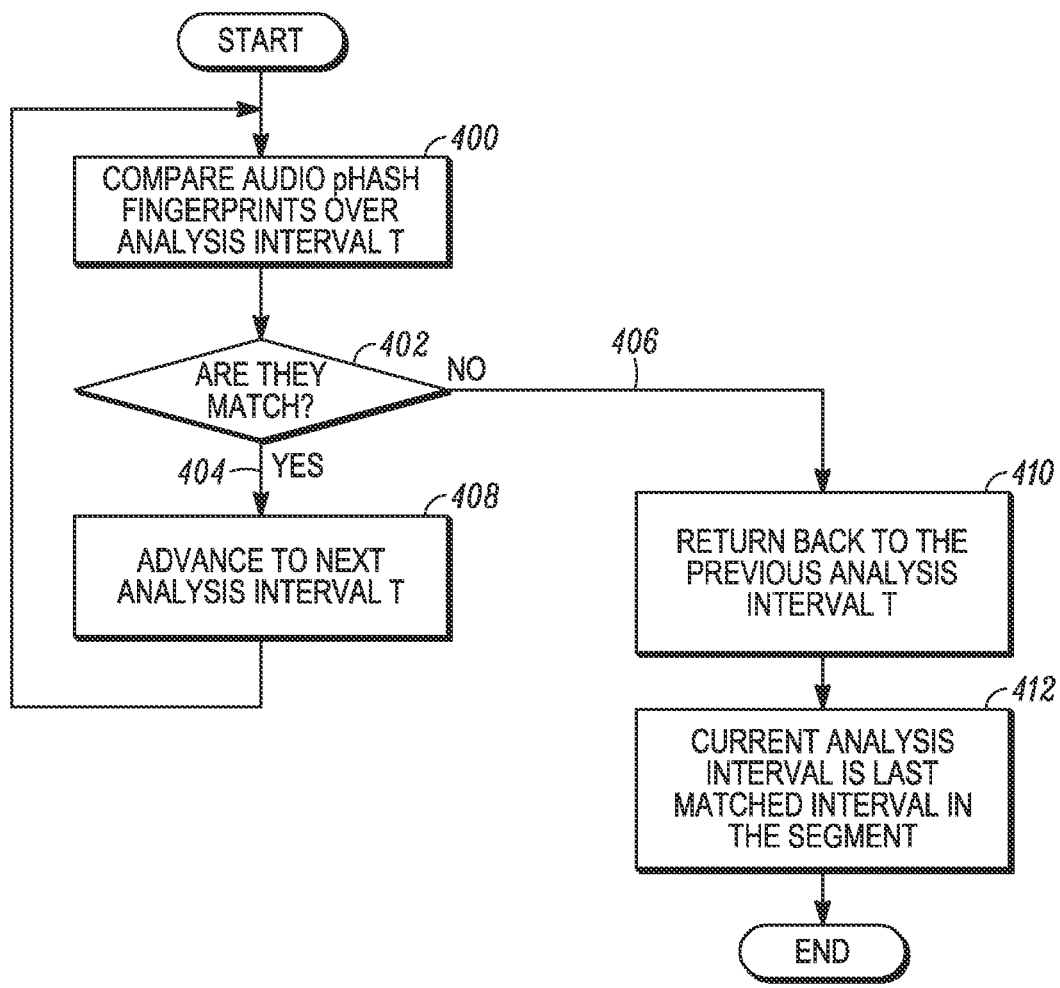
FIG. 13 illustrates a flowchart of a process of determining an end of matched audio intervals.

The algorithm of FIG. 13 determines the end of matched audio segments.

1. At a step 400 two audio pHash fingerprints (fingerprints Type 2) are compared using the "Segmented BER" technique and the analysis interval T.

2. A decision step 402 determines whether the fingerprints match (affirmative path 404) or do not match (negative path 406).

3. At a step 408 on the path 404, the process advances to the next pHash fingerprint interval then returns to the step 400.

4. On the path 406 the current pHash fingerprints are different and at a step 410 returns to the last analysis interval, since the audio fingerprints in that interval matched. Thus, as indicated by at a step 412, the end of this last analysis interval T is considered the end of the matched audio segment. Here too, an alert can be issued that the audio streams do not match.

Measurement of Network Parameters

The system of the invention can beneficially measure at least the following three network parameters. Other network anomalies are easy to detect, such as different bitrates, different video resolutions, different video frame rates, different video aspect ratios, different video scenes, etc. An alert would be indicative that one of these anomalies occurred.

Delay Between Two Video Streams

After two video fingerprints sequences are aligned, the time difference between the timestamps of two paired or matched fingerprints (also referred to as corresponding fingerprints, e.g., a first fingerprint from a first sequence and a second fingerprint from a second sequence) is equivalent to the delay between two sequences. Note that this delay can be measured only after the two video fingerprint sequences have been time-aligned and matched. The accuracy of the measured delay is equivalent to the video fingerprints alignment accuracy, which can be one frame.

Delay Between Two Audio Streams

After two audio fingerprints sequences are aligned, the time difference between the timestamps of two paired or matched fingerprints is equivalent to the delay between two audio fingerprints sequences. Delays can be measured only after the two audio fingerprint sequences have been aligned and matched. The accuracy of the measured delay is equivalent to the alignment accuracy of the audio fingerprints, which can be 1 msec.

Delay Between Video and Audio in the Video/Audio Stream (LipSync Delay).

To measure LipSync delay the system uses two spaced-apart probes. Probe 1 is connected to a reference source of the video/audio stream, which has no delay between video and audio information. Typically probe 1 is located at the output of the content source. Probe 2 is connected to a point in the distribution path where the LipSync delay is measured. At each probe both the video and audio streams are fingerprinted. At a comparison point (e.g., at probe 2) the two video fingerprints sequences and two audio fingerprints sequences are independently aligned. Then the video delay in the data stream between the probes 1 and 2 is measured and the audio delay between the probes 1 and 2 is measured. If the two delays are the same, then there is no LipSync delay in the video/audio stream at the probe 2. Otherwise, the difference between video and audio delays is LipSync delay between the video and audio streams.

What is claimed is:

1. A method for comparing video information at first and second spaced-apart locations on a video transport network, the method comprising:
    at a first and second network probe located at the respective first and second spaced-apart locations, extracting a respective first and second plurality of video frames from the network;
    calculating a first and a second fingerprints sequence from each one of the respective first and second plurality video frames;
    matching and time-aligning a first block of the first fingerprints sequence and a second block of the second fingerprints sequence;
    starting with a first matched and time-aligned fingerprints sequence and a second matched and time-aligned fingerprints sequence determining a beginning of a matched segment of fingerprints; and
    wherein the step of matching and time-aligning further comprises calculating a Hamming distance value between a fingerprint from the first block and a corresponding fingerprint from the second block, wherein the first and second blocks are matched and time-aligned if calculated Hamming distance values are equal to or less than a Hamming distance threshold, wherein if the Hamming distance values are greater than the Hamming distance threshold the first block is shifted by one video frame relative to the second block and the step of calculating a Hamming distance values repeated, wherein if a cumulative number of shifts is greater than a maximum number of shifts, a next fingerprints sequence replaces the first fingerprints sequence of the first block and a next fingerprints sequence replaces the second fingerprints sequence of the second block.

2. The method of claim 1 further comprising determining an end of the matched segment of fingerprints.

3. The method of claim 2 wherein the end of the matched segment indicates the occurrence of a technical problem between the first and second locations or a change in video content between the first and second locations.

4. The method of claim 2 wherein the step of determining the beginning of the matched segment further comprises issuing a fingerprints matched alert and the step of determining the end of the matched segment further comprises issuing a fingerprints different alert.

5. The method of claim 1 prior to the step of matching and time-aligning;
    wherein the first and second plurality of video frames comprise a first and second plurality of progressive scanned video frames;
    generating a respective first and second plurality of interpolated video frames, each having a same frame rate, from a respective first and second plurality of progressive scanned video frames;
    reducing a video frame size of each of the first and second plurality of interpolated video frames to generate a respective first and second plurality of reduced-size interpolated video frames; and
    wherein for the step of matching and time-aligning, the first fingerprints sequence comprises a fingerprints sequence determined from the first plurality of reduced-size interpolated video frames, and the second fingerprints sequence comprises a fingerprints sequence determined from the second plurality of reduced-size interpolated video frames.

6. The method of claim 5 wherein the step of generating the first plurality of interpolated video frames further comprises interpolating between two consecutive video frames from the first plurality of video frames, and the step of generating the second plurality of interpolated video frames further comprises interpolating between two consecutive video frames from the second plurality of video frames.

7. The method of claim 1 prior to the step of matching and time-aligning;
    wherein the first and second plurality of video frames comprise a first and second plurality of interlaced scanned video frames;
    reducing a video frame size for a top field and reducing a video frame size for a bottom field of each of the first and second plurality of interlaced scanned video frames to generate a respective first and second plurality of top and bottom reduced-size video frames;
    generating a first and second plurality of reduced-size interpolated video frames, each having a same frame rate, from a respective top field and bottom field of each one of the first and second plurality of top and bottom reduced-size video frames; and
    wherein for the step of matching and time-aligning, the first fingerprints sequence comprises a fingerprints sequence determined from the first plurality of reduced-size interpolated video frames, and the second fingerprints sequence comprises a fingerprints sequence determined from the second plurality of reduced-size interpolated video frames.

8. The method of claim 7 wherein the step of generating the first plurality of reduced-size interpolated video frames further comprises interpolating between two consecutive reduced-size video frames from the first plurality of reduced-size video frames, and the step of generating the second plurality of reduced-size interpolated video frames further comprises interpolating between two consecutive video frames from the second plurality of reduced-size video frames.

9. The method of claim 1 further comprising removing all color information.

10. The method of claim 1 wherein each one of the plurality of first and second fingerprints sequences further comprise a timestamp, the method further comprising after the step of determining a beginning of a matched segment, a timestamp associated with first and second matched fingerprints in the matched segment are compared to determine a delay therebetween.

11. The method of claim 1 wherein the step of determining a beginning of a matched segment further comprises iteratively shifting each fingerprints sequence in a first direction until the fingerprints do not match and then shifting one frame in a second direction opposite to the first direction, creating the matched segment.

12. The method of claim 1 wherein the step of calculating further comprises calculating each one of the first and second plurality of fingerprints sequence using an aHash algorithm, a dHash algorithm, or a pHash algorithm.

13. The method of claim 1 wherein the first network probe is located at a video content source on the network and the second network probe is located at a "last mile" on the network.

14. The method of claim 1 wherein the first plurality of video frames have a first frame rate and the second plurality of video frames have a second frame rate, the first frame rate different from the second frame rate.

15. A method for comparing audio information at first and second spaced-apart locations on a content distribution network, the method comprising:
at a first and second network probe located at the respective first and second spaced-apart locations, extracting a respective first and second audio segments from the network;
calculating a first and second audio fingerprints sequence from each one of the respective first and second plurality audio segments;
matching and time-aligning a first analysis interval of the first audio fingerprints sequence with a second analysis interval of the second audio fingerprints sequence;
starting with a first matched and time-aligned fingerprints sequence and a second matched and time-aligned fingerprints sequence determining a beginning of a matched stream of audio fingerprints; and
wherein the step of determining the beginning of the matched stream further comprises calculating third and fourth audio fingerprints sequences based on a one millisecond interval, calculating a bit error rate between a fingerprint from the third fingerprints sequence and a corresponding fingerprint from the fourth fingerprints sequence, changing a delay between the third and fourth fingerprints sequences in one millisecond intervals and repeating the calculating step until a lowest bit error rate value is found such that the first matched and time-aligned fingerprints sequence and the second matched and time-aligned fingerprints sequence are aligned with one millisecond accuracy.

16. The method of claim 15 further comprising determining an end of the matched stream of audio fingerprints.

17. The method of claim 16 wherein the end of the matched stream indicates the occurrence of a technical problem between the first and second locations or a change in audio content between the first and second locations.

18. The method of claim 16 wherein the step of determining the beginning of the matched stream further comprises issuing an audio fingerprints matched alert and the step of determining the end of the matched stream further comprises issuing an audio fingerprints different alert.

19. The method of claim 15 wherein each one of the first and second plurality of audio segments further comprises a timestamp, the method further comprising after the step of determining the beginning of a matched stream, a timestamp associated with first and second matched fingerprints in the matched stream are compared to determine a delay therebetween.

20. The method of claim 15 wherein the step of matching and time-aligning further comprises defining a first analysis interval further comprising a first plurality of audio fingerprint segments and a second analysis interval further comprising a second plurality of audio fingerprint segments, each first audio fingerprint segment comprising a plurality of first audio fingerprints sequences and each second audio fingerprint segment comprising a plurality of second audio fingerprints sequences, calculating a bit error rate between each one of the first plurality of audio fingerprint segments and a corresponding one of the second plurality of audio fingerprint segments, wherein the first and second analysis intervals are matched and time-aligned if a predetermined number or a predetermined percentage of calculated bit error rates are equal to or less than a bit error rate threshold, wherein if the predetermined number or the predetermined percentage of calculated bit error rates are greater than the bit error rate threshold then the first analysis interval is shifted by a predetermined number of msec relative to the second analysis interval and the step of calculating a bit error rate is repeated, wherein if a cumulative number of shifts is greater than a maximum number of shifts, a first next audio fingerprints segment is added to an end of the first analysis interval and a first earliest-in-time audio fingerprints segment is removed from the first analysis interval and a second next audio fingerprints segment is added to the second analysis interval and a second earliest-in-time audio fingerprints segment is removed from the second analysis interval.

21. The method of claim 20 wherein the predetermined number of milliseconds comprises 25 milliseconds.

22. The method of claim 15 wherein the step of calculating further comprises calculating the first and second audio fingerprints sequences using a pHash algorithm, each one having a duration of 625 msec of audio and represented by 32 bits, and calculating the third and fourth audio fingerprints sequences using an SMPTE ST 2064-1 algorithm each one having a duration of 1 msec of audio and represented by 1 bit.

23. A system for comparing video and audio information at local and remote locations on a content delivery network, the system comprising:
a fingerprint processor for generating a first fingerprints sequence from video frames and from audio segments as extracted from the network at the local location;

a network interface for receiving a second fingerprints sequence for each video frame and audio segments as extracted from the network at the remote location;

first and second variable delay components receiving as an input the first and second fingerprints sequences, applying first and second delay intervals to the respective first and second fingerprints sequences, and generating as an output respective third and fourth fingerprints sequences delayed with respect to the first and second fingerprints sequences;

a controller for determining and inputting the first and second delay intervals to the respective first and second variable delay components;

a match processor for receiving the third and fourth fingerprints sequences and for producing a comparison signal responsive to whether the third and fourth fingerprints sequences are matched and time-aligned, the comparison signal input to the first and second variable delay components for effecting the first and second delay intervals, the matched and time-aligned third and fourth fingerprints sequences comprise a matched segment; and the match processor for determining a beginning of a matched segment and for determining whether fingerprints within the matched segment after the beginning of the matched segment are matched or are different.

24. The system of claim 23 wherein the match processor determines an end of the matched segment of fingerprints in which a fingerprint from the third fingerprints sequence does not match a corresponding fingerprint from the fourth fingerprints sequence.

25. The system of claim 24 wherein the end of the matched segment indicates the occurrence of a technical problem between the first and second locations or a change in video content between the first and second locations.

26. The system of claim 23 further comprising a controller responsive to the match processor for issuing a matched alert at a beginning of the matched segment and issuing a different alert at an end of the matched segment.

27. The system of claim 23 the video frames comprising progressive frames or interlaced frames.

28. The system of claim 23 the video frames comprising reduced-size video frames.

29. The system of claim 23 the video frames comprising interpolated video frames all at a same bit rate, the fingerprints processor interpolating between two consecutive video frames to generate the interpolated video frames.

30. The system of claim 23 the first and second fingerprints sequences lacking video color information.

31. The system of claim 23 wherein each fingerprint in the first fingerprints sequence comprises a first time stamp and each fingerprint in the second fingerprints sequence comprises a second time stamp, after the matched processor determines the matched segment, the first timestamp compared with the second timestamp to determine a delay therebetween.

32. The system of claim 23 wherein each fingerprint in the first fingerprints sequence and each fingerprint in the second fingerprints sequence is determined using an aHash algorithm, a dHash algorithm, or a pHash algorithm for video frames and a combination of the pHash algorithm and an SMPTE ST 2064-1 algorithm for audio segments.

33. The system of claim 23 wherein the local location comprises an originating source location for the video frames and the audio segments, and the remote location comprises a "last mile" where the video frames and audio segments are received by a user.

* * * * *